(12) United States Patent
Isono et al.

(10) Patent No.: US 9,796,369 B2
(45) Date of Patent: Oct. 24, 2017

(54) HYDRAULIC BRAKE SYSTEM

(75) Inventors: Hiroshi Isono, Mishima (JP); Yasuji Mizutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 616 days.

(21) Appl. No.: 14/367,062

(22) PCT Filed: Jan. 13, 2012

(86) PCT No.: PCT/JP2012/050608
§ 371 (c)(1),
(2), (4) Date: Jun. 19, 2014

(87) PCT Pub. No.: WO2013/105268
PCT Pub. Date: Jul. 18, 2013

(65) Prior Publication Data
US 2014/0345271 A1    Nov. 27, 2014

(51) Int. Cl.
| | | |
|---|---|---|
| *B60T 13/66* | (2006.01) | |
| *B60T 1/10* | (2006.01) | |
| *B60T 7/04* | (2006.01) | |
| *B60T 13/14* | (2006.01) | |
| *B60T 13/68* | (2006.01) | |
| *B60T 8/40* | (2006.01) | |

(52) U.S. Cl.
CPC ............... *B60T 13/66* (2013.01); *B60T 1/10* (2013.01); *B60T 7/042* (2013.01); *B60T 8/4077* (2013.01); *B60T 13/146* (2013.01); *B60T 13/662* (2013.01); *B60T 13/686* (2013.01)

(58) Field of Classification Search
CPC .... B60T 13/686; B60T 13/662; B60T 8/3655; B60T 13/68; B60T 11/224; B60T 7/042
USPC ................................................... 60/533, 593
See application file for complete search history.

(56) References Cited

U.S. PATENT DOCUMENTS

| | | | | |
|---|---|---|---|---|
| 6,412,881 B1 * | 7/2002 | Isono | ..................... | B60T 8/367 188/356 |
| 6,431,662 B2 * | 8/2002 | Isono | .................... | B60T 8/3275 303/113.1 |

(Continued)

FOREIGN PATENT DOCUMENTS

| | | |
|---|---|---|
| JP | A-2011-51400 | 3/2013 |
| WO | WO 2012/114510 A1 | 8/2012 |

*Primary Examiner* — Edelmira Bosques
*Assistant Examiner* — Richard Drake
(74) *Attorney, Agent, or Firm* — Oliff PLC

(57) ABSTRACT

A hydraulic brake system for braking a vehicle, including a master cylinder device having a fluid-flow permission mechanism that permits a flow of a working fluid between an inter-piston chamber and a low-pressure source, wherein, when a pressure of the working fluid to be supplied to a brake device exceeds a set pressure upon advancing in association with an advancing movement of a brake operation member, a closing and opening mechanism for hermetically closing the inter-piston chamber and opening an opposing chamber to the low-pressure source is controlled so as to hermetically close the inter-piston chamber, while, when the pressure of the working fluid becomes lower than a set pressure upon retracting in association with a retracting movement of the brake operation member, the fluid-flow permission mechanism is controlled so as to permit the flow of the working fluid between the inter-piston chamber and the low-pressure source.

7 Claims, 12 Drawing Sheets

(56) References Cited

U.S. PATENT DOCUMENTS

| | | | |
|---|---|---|---|
| 6,709,072 B2* | 3/2004 | Kusano | B60T 8/172 |
| | | | 188/358 |
| 6,739,676 B1* | 5/2004 | Isono | B60T 8/365 |
| | | | 188/356 |
| 8,714,662 B2* | 5/2014 | Isono | B60T 8/885 |
| | | | 303/114.1 |
| 9,038,380 B2* | 5/2015 | Isono | B60T 13/144 |
| | | | 60/563 |
| 9,211,876 B2* | 12/2015 | Miwa | B60T 8/17 |
| 9,238,453 B2* | 1/2016 | Uechi | B60T 11/16 |
| 9,358,891 B2* | 6/2016 | Isono | B60T 8/17 |
| 9,399,453 B2* | 7/2016 | Isono | B60T 7/042 |
| 9,487,191 B2* | 11/2016 | Masuda | B60T 7/042 |
| 2008/0210499 A1* | 9/2008 | Isono | B60T 8/328 |
| | | | 188/72.4 |
| 2010/0089709 A1* | 4/2010 | Shimada | B60T 1/10 |
| | | | 188/159 |
| 2012/0144822 A1 | 6/2012 | Isono | |
| 2013/0318964 A1 | 12/2013 | Isono | |

\* cited by examiner

HYDRAULIC BRAKE SYSTEM

TECHNICAL FIELD

The present invention relates to a hydraulic brake system for braking a vehicle.

BACKGROUND ART

In a hydraulic brake system, a master cylinder device is generally employed for pressurizing a working fluid and supplying the pressurized working fluid to a brake device. For instance, in the master cylinder device disclosed in the following Patent Literature, a pressurizing piston for pressurizing the working fluid to be supplied to the brake device and an input piston to which an operation force by a driver is applied are provided so as to be spaced apart from each other. In general, the operation force is not transmitted to the pressurizing piston. Accordingly, the master cylinder device is configured such that the pressurizing piston moves forward while depending on a pressure of a highly pressurized working fluid supplied thereto, so as to pressurize the working fluid. Further, in the disclosed master cylinder device, where a comparatively large braking force is required, for instance, the input piston comes into contact with the pressurizing piston, and the pressurizing piston moves forward while depending on the operation force, in addition to the pressure of the highly pressurized working fluid, thereby pressurizing the working fluid.

CITATION LIST

Patent Literature

Patent Literature 1: JP-A-2011-051400

DISCLOSURE OF INVENTION

(A) Summary of Invention

In the master cylinder device disclosed in the above Patent Literature, the input piston comes into contact with the pressurizing piston in the middle of an advancing movement of the brake operation member by the driver. Accordingly, a relative position of the input piston and the pressurizing piston changes in the middle of a braking operation. Therefore, if the relative position is kept fixed even when the brake operation member is retracted thereafter, the relative position differs between when the brake operation member is advanced and when the brake operation member is retracted. As a result, a relationship between the operation amount of the brake operation member and the braking force generated by the brake device differs between when the brake operation member is advanced and when the brake operation member is retracted, so that the driver may feel uncomfortable or unnatural in the braking operation. There is plenty of room for improvement in the hydraulic brake system, including improvement for reducing such an uncomfortable or unnatural feeling. It is accordingly possible to enhance utility of the hydraulic brake system by making some improvement. The present invention has been made in view of such situations. It is therefore an object of the invention to improve utility of the hydraulic brake system.

To achieve the object indicated above, a hydraulic brake system according to the present invention has a master cylinder device. In the master cylinder device, there is defined an inter-piston chamber between a pressurizing piston and an input piston, such that the two pistons face to each other with the inter-piston chamber interposed therebetween. Further, the master cylinder device has a fluid-flow permission mechanism that permits a flow of a working fluid between the inter-piston chamber and a low-pressure source. In the hydraulic brake system, when a pressure of the working fluid to be supplied to the brake device exceeds a set pressure upon advancing in association with an advancing movement of the brake operation member, a closing and opening mechanism for hermetically closing the inter-piston chamber and opening an opposing chamber to the low-pressure source is controlled so as to hermetically close the inter-piston chamber. On the other hand, when the pressure of the working fluid to be supplied to the brake device becomes lower than a set pressure upon retracting in association with a retracting movement of the brake operation member, the fluid-flow permission mechanism is controlled so as to permit the flow of the working fluid between the inter-piston chamber and the low-pressure source.

According to the present hydraulic brake system, even where the relative position of the input piston and the pressurizing piston changes in association with the advancing movement of the brake operation member, the inter-piston chamber is hermetically closed, and the relative position is accordingly fixed, the flow of the working fluid between the inter-piston chamber and the low-pressure source is permitted in association with the retracting movement of the brake operation member. It is therefore possible to change the relative position in the subsequent retracting movement of the brake operation member. Accordingly, the relative position that has been changed and fixed in the advancing movement of the brake operation member can be again changed in the retracting movement of the brake operation member, thereby enabling the driver to be less likely to feel uncomfortable or unnatural in the braking operation.

(B) Forms of Invention

There will be exemplified and explained various forms of an invention that is considered claimable (hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention. Some of the forms of the claimable invention correspond to claims.

More specifically, in the following forms, the form (1) corresponds to claim 1. The form (2) corresponds to claim 2. The form (4) corresponds to claim 3. The form (6) corresponds to claim 4. The form (7) corresponds to claim 5. The form (12) corresponds to claim 6. The form (13) corresponds to claim 7.

(1) A hydraulic brake system for braking a vehicle, comprising:

a brake device provided for a wheel, a master cylinder device configured to supply a pressurized working fluid to the brake device;

a brake operation member which is disposed rearward of the master cylinder device and on which a braking operation by a driver is made;

a high-pressure-source device configured to regulate a highly-pressurized working fluid and to supply the regulated working fluid to the master cylinder device; and a controller configured to control the hydraulic brake system, wherein the master cylinder device has (a) a housing whose front-side end is closed and which includes a partition portion partitioning an interior of the housing into a front-side chamber and a rear-side chamber, the partition portion having an opening formed therethrough, (b) a pressurizing piston which has a main body portion having a flange formed at a rear end of the main body portion and disposed in the front-side chamber, and (c) an input piston connected to the brake operation member and disposed in the rear-side chamber, wherein the master cylinder device has (A) a pressurizing chamber which is defined forward of the main body portion of the pressurizing piston and in which a working fluid to be supplied to the brake device is pressurized by a forward movement of the pressurizing piston, (B) an inter-piston chamber defined between the pressurizing piston and the input piston by utilizing the opening formed in the partition portion of the housing, such that the pressurizing piston and the input piston face to each other with the inter-piston chamber interposed therebetween, (C) an input chamber which is defined between the flange formed on the main body portion of the pressurizing piston and the partition portion and to which the working fluid from the high-pressure-source device is supplied, and (D) an opposing chamber which is formed forward of the flange so as to be opposed to the input chamber with the flange interposed therebetween, wherein (E) a pressure receiving area of the pressurizing piston on which a pressure of a working fluid in the inter-piston chamber acts and a pressure receiving area of the pressurizing piston on which a pressure of a working fluid in the opposing chamber acts are made equal to each other, and the inter-piston chamber and the opposing chamber are brought into communication with each other so as to serve as a single reaction-force chamber in the master cylinder device, wherein the master cylinder device further has (I) a reaction-force applying mechanism configured to apply, to the input piston, a reaction force against a forward movement of the input piston having a magnitude in accordance with an amount of the forward movement, by elastically pressurizing a working fluid in the reaction-force chamber, (II) a closing and opening mechanism for hermetically closing the inter-piston chamber and opening the opposing chamber to a low-pressure source, and (III) a fluid-flow permission mechanism for permitting a flow of a working fluid between the inter-piston chamber and the low-pressure source, wherein the controller includes an input-pressure control portion that controls the high-pressure-source device so as to control a pressure of the working fluid that is supplied from the high-pressure-source device to the input chamber, such that the pressure of the working fluid to be supplied to the brake device becomes equal to a pressure determined based on the braking operation on the brake operation member, a beyond-set-pressure control portion that executes a beyond-set-pressure control in which the closing and opening mechanism is controlled so as to hermetically close the inter-piston chamber and to open the opposing chamber to the low-pressure source, when the pressure of the working fluid to be supplied to the brake device exceeds a set pressure upon advancing in association with an advancing movement of the brake operation member, and a retract-operation control portion that executes a retract-operation control in which the fluid-flow permission mechanism is controlled so as to permit the flow of the working fluid between the inter-piston chamber and the low-pressure source, when the pressure of the working fluid to be supplied to the brake device becomes lower than a set pressure upon retracting in association with a retracting movement of the brake operation member in an instance where the beyond-set-pressure control is being executed.

In the master cylinder device of the hydraulic brake system constructed as described above, the inter-piston chamber is defined between the input piston and the pressurizing piston. When the inter-piston chamber is hermetically closed by the closing and opening mechanism, the operation force by the driver is transmitted to the pressurizing piston via the working fluid in the inter-piston chamber. When the flow of the working fluid between the inter-piston chamber and the low-pressure source is permitted by the fluid-flow permission mechanism, the operation force by the driver is not transmitted to the pressurizing piston.

In the master cylinder device, the pressure receiving area of the pressurizing piston on which the pressure of the working fluid in the inter-piston chamber acts is made equal to the pressure receiving area of the pressurizing piston on which the pressure of the working fluid in the opposing chamber acts. Accordingly, the magnitude of a force that acts on the pressurizing piston in a forward direction and the magnitude of a force that acts on the pressurizing piston in a rearward direction, by a pressure of the working fluid in the reaction-force chamber constituted as a result of fluid communication between the inter-piston chamber and the opposing chamber, are equal to each other. Accordingly, even if the input piston is advanced and the reaction-force applying mechanism pressurizes the working fluid in the reaction-force chamber when the inter-piston chamber and the opposing chamber are held in communication with each other, the pressurizing piston does not move. Further, the pressure receiving areas are made equal to each other as described above, whereby a volume change of the working fluid in the inter-piston chamber and a volume change of the working fluid in the opposing chamber that are caused by a movement of the pressurizing piston are equal to each other. That is, when the pressurizing piston moves, the working fluid flows between the inter-piston chamber and the opposing chamber, and the flow between the inter-piston chamber and the opposing chamber does not cause any movement of the input piston. Thus, in the master cylinder device according to this form, the input piston and the pressurizing piston are configured so as to be movable independently of each other.

Usually, in the thus constructed master cylinder device, when the working fluid is supplied from the high-pressure-source device to the input chamber, the pressurizing piston moves forward in accordance with a pressure of the working fluid in the input chamber (hereinafter referred to as "input pressure" where appropriate) so as to pressurize the working fluid. In the present hydraulic brake system, therefore, when the inter-piston chamber is held in communication with the opposing chamber, there is established a state in which the working fluid in the pressurizing chamber is pressurized in dependence on only the input pressure, without depending on the forward movement of the input piston caused by the operation force applied to the operation member by the driver. (This state will be hereinafter referred to as "input-pressure-dependent pressurizing state" where appropriate.) Also in this state, a reaction force by the reaction-force applying mechanism acts, as an operation reaction force with respect to the braking operation, on the brake operation member via the input piston. Therefore, the driver can feel as if the working fluid in the pressurizing chamber is pressurized by the operation force that the driver applies to the brake operation member for thereby activating the brake device. That is, the reaction-force applying mechanism is one constituent element of the so-called stroke simulator.

In the present hydraulic brake system, the pressure of the working fluid to be supplied to the brake device (hereinafter referred to as "master pressure" where appropriate) is determined based on the operation of the brake operation member. Accordingly, in the input-pressure-dependent pressurizing state, a target master pressure is determined based on the operation of the brake operation member, and the input-pressure control portion controls the input pressure such that the master pressure becomes equal to the determined target master pressure. Moreover, in the input-pressure-dependent pressurizing state, the master pressure changes in dependence on the input pressure as described above. Therefore, a target input pressure may be determined based on the operation of the brake operation member, in place of the target master pressure, and the input-pressure control portion may control the input pressure such that the input pressure becomes equal to the determined target input pressure.

In an instance where the master pressure exceeds the set pressure upon advancing when the master cylinder device is being activated with the input-pressure-dependent pressurizing state established, the beyond-set-pressure control is executed for hermetically closing the inter-piston chamber and opening the opposing chamber. Accordingly, the operation force of the driver is transmitted to the pressurizing piston via the working fluid in the hermetically closed inter-piston chamber. In the beyond-set-pressure control, therefore, there is established a state in which the working fluid in the pressurizing chamber is pressurized in dependence on the operation force, in addition to the input pressure. (This state will be hereinafter referred to as "input-pressure-and-operation-force-dependent pressurizing state" where appropriate.) In this state, the opposing chamber is opened to the low-pressure source, whereby the pressure of the working fluid in the opposing chamber does not cause the pressurizing piston to undergo the force in the rearward direction. That is, in the input-pressure-and-operation-force-dependent pressurizing state, an increase of the master pressure is not hindered by the force in the rearward direction.

In the hydraulic brake system, when the master pressure becomes lower than the set pressure upon retracting during execution of the beyond-set-pressure control, the retract-operation control is executed, thereby permitting the flow of the working fluid between the inter-piston chamber and the low-pressure source. Accordingly, when the flow of the working fluid is permitted, it is possible to permit the working fluid in the inter-piston chamber that is pressurized by the master pressure and the operation force to flow out from the inter-piston chamber into the low-pressure source. As a result, the volume of the inter-piston chamber can be changed. In this sense, the fluid-flow permission mechanism may be regarded as a volume-change permission mechanism for permitting a volume change of the inter-piston chamber. Further, the volume change of the inter-piston chamber is caused in association with a relative movement of the input piston and the pressurizing piston. Accordingly, the fluid-flow permission mechanism may be regarded as a spacing-distance-change permission mechanism for permitting a change of the spacing distance between the input piston and the pressurizing piston.

In the thus constructed master cylinder device, when the volume of the inter-piston chamber changes as a result of an advancing movement of the brake operation member, the volume of the inter-piston chamber, which is configured to be hermetically closed when the master pressure exceeds the set pressure upon advancing, is fixed to a volume that is different from an initial volume of the inter-piston chamber, namely, different from a volume of the inter-piston chamber at the time of initiation of the braking operation. In other words, the spacing distance between the input piston and the pressurizing piston is fixed to a distance that is different from an initial spacing distance, namely, different from a spacing distance at the time of initiation of the braking operation. Therefore, when the brake operation member is retracted with the spacing distance between the input piston and the pressurizing piston fixed to the different spacing distance and the brake operation member is no more operated thereafter, the position of the brake operation member differs from an initial position, namely, differs from the position of the brake operation member at the time of initiation of the braking operation. In the present hydraulic brake system, however, the flow of the working fluid between the inter-piston chamber and the low-pressure source is permitted in association with the retracting movement of the brake operation member. Hence, when the master pressure becomes lower than the set pressure upon retracting in the subsequent retracting movement of the brake operation member, it is possible to change the spacing distance between the input piston and the pressurizing piston. Accordingly, the relative position that has been changed and fixed in the advancing movement of the brake operation member can be again changed in the retracting movement of the brake operation member, thereby enabling the driver to be less likely to feel uncomfortable or unnatural in the braking operation.

The "advancing movement" of the brake operation member in this form means that the brake operation member is advanced by an increase in the operation force. The advancing movement of the brake operation member causes the input piston connected to the brake operation member to be advanced. Further, the "retracting movement" of the brake operation member means that the brake operation member is retracted by a decrease in the operation force. The "retracting movement" of the brake operation member causes the input piston to be retracted.

The "set pressure upon advancing" and the "set pressure upon retracting" may be the same level or may be mutually different levels. When the retract-operation control is executed in association with initiation of the retracting movement of the brake operation member, the master pressure at the time of initiation of the retracting movement is set as the set pressure upon retracting. That is, in this instance, the flow of the working fluid between the inter-piston chamber and the low-pressure source is permitted at the same time when the brake operation member starts to be retracted. As described above, in the input-pressure-dependent pressurizing state, the master pressure changes in dependence on the input pressure. Accordingly, the set pressure upon advancing that triggers execution of the beyond-set-pressure control may be determined based on the input pressure.

For instance, the "set pressure upon advancing" may be set to a master pressure at a time when the input pressure reaches almost a maximum pressure that the high-pressure-source device can generate. In this instance, when the braking force generated in the brake device becomes substantially maximum in the input-pressure-dependent pressurizing state, the input-pressure-and-operation-force-dependent pressurizing state is established. Accordingly, the master pressure can be further increased by the operation force, whereby the braking force larger than that in the input-pressure-dependent pressurizing state can be generated in the brake device.

In this form, the input-pressure control portion controls the pressure of the working fluid that is supplied to the input chamber "based on the braking operation of the brake operation member". For instance, the input-pressure control portion controls the pressure of the working fluid that is supplied to the input chamber based on an operation amount of the brake operation member or based on the operation force applied to the brake operation member. Alternatively, the input-pressure control portion may control the pressure of the working fluid based on both of the operation amount and the operation force. It is not required that the target master pressure or the target input pressure indicated above increase in proportion to an increase of the operation amount or the operation force. Where the present hydraulic brake system is installed on a vehicle equipped with a regenerative brake that utilizes an electric generator, such as a hybrid vehicle or an electric vehicle, the vehicle is braked also by the regenerative brake. In such a vehicle, even if the operation amount or the operation force is increased, the braking force is not necessarily generated in the brake device utilizing the hydraulic brake, e.g., in an instance in which a necessary braking force is obtained by the regenerative brake. In view of this, in the present hydraulic brake system, the target master pressure may be determined such that the target master pressure is increased after the operation amount or the operation force reaches a certain extent, so as to permit the braking force to be generated by the hydraulic brake.

In the master cylinder device according to this form, the "inter-piston chamber" may be variously defined. For instance, the inter-piston chamber may be defined by a transmission rod which penetrates a separation wall of the housing and whose proximal end portion is fixed to one of the input piston and the pressurizing piston while a distal end thereof is spaced apart from the other of the input piston and the pressurizing piston in a state in which the input piston is not advanced. Alternatively, the inter-piston chamber may be defined as follows. The pressurizing piston has a blind hole that is open on the rear side, and the partition portion has an annular partition wall portion that protrudes in a radially inward direction of the housing and an inner tube portion that extends forward from an inner end of the partition wall portion. The inner tube portion is fitted into the blind hole of the pressurizing piston, and the input piston is held in contact with the inner circumferential surface of the inner tube portion, whereby the inter-piston chamber is defined in the inside of the blind hole.

The structure of the "reaction-force applying mechanism" of the master cylinder device in this form is not particularly limited, and various structures may be employed. Because the reaction-force applying mechanism elastically pressurizes the working fluid, the reaction-force applying mechanism may be configured so as to have a structure having a compression coil spring or a diaphragm. Further, the reaction-force applying mechanism may be disposed outside the housing of the master cylinder device so as to communicate with the reaction-force chamber, thereby pressurizing the working fluid in the reaction-force chamber. Moreover, the reaction-force applying mechanism may be disposed inside the housing. For instance, the input piston may be elastically expandable and contractible, and the working fluid in the reaction-force chamber may be pressurized by an elastic force generated by the input piston.

(2) The hydraulic brake system according to the form (1), wherein the fluid-flow permission mechanism permits the flow of the working fluid between the inter-piston chamber and the low-pressure source while restricting a flow amount of the working fluid.

In the hydraulic brake system according to this form, where the flow of the working fluid between the inter-piston chamber and the low-pressure source is freely permitted, for instance, the operation force is not transmitted to the pressurizing piston, so that the master pressure drastically or abruptly changes. In the hydraulic brake system according to this form, the flow amount of the working fluid is restricted, and the operation force is transmitted to the pressurizing piston via the working fluid in the inter-piston chamber. As a result, it is possible to obviate a situation in which the master pressure drastically or abruptly changes, thereby enabling the driver to be less likely to feel uncomfortable or unnatural in the braking operation. In the hydraulic brake system, to "restrict the flow amount of the working fluid" may be construed as "permitting the working fluid to be less likely to flow".

(3) The hydraulic brake system according to the form (2), wherein the retract-operation control portion restricts, in the retract-operation control, the flow amount of the working fluid between the inter-piston chamber and the low-pressure source for restricting a reduction in a volume of the inter-piston chamber.

In the hydraulic brake system according to this form, the restriction of the flow amount of the working fluid described above is carried out for restricting a reduction in the volume of the inter-piston chamber. Accordingly, it is possible to obviate a situation in which, when the flow of the working fluid is permitted, the working fluid in the inter-piston chamber flows to the low-pressure source rapidly or momentarily, causing a drastic or abrupt change in the master pressure. Further, it is possible to gradually reduce the volume of the inter-piston chamber in accordance with the amount of the retracting movement of the brake operation member, for instance. Therefore, it is possible to gradually lower the master pressure in accordance with the amount of the retracting movement of the brake operation member, thereby comparatively slowly lower the braking force generated in the brake device. In view of the relationship between: the volume of the inter-piston chamber; and the spacing distance between the pressurizing piston and the input piston, it may be considered that, in the hydraulic brake system, the retract-operation control portion is configured to restrict the flow amount of the working fluid between the inter-piston chamber and the low-pressure source so as to restrict a reduction in the spacing distance.

(4) The hydraulic brake system according to the form (2) or (3), wherein the fluid-flow permission mechanism is configured such that a degree of restriction of the flow amount of the working fluid between the inter-piston chamber and the low-pressure source is changeable.

To "change a degree of the flow amount" of the working fluid in the hydraulic brake system according to this form may be construed as "changing a degree of difficulty for the working fluid to flow". That is, if the working fluid is more difficult to flow, the flow amount is restricted to a considerably high extent and the flow amount is accordingly decreased. On the other hand, if the working fluid is not more difficult to flow, namely, if the working fluid more readily flows, the flow amount is not so restricted and the flow amount is accordingly increased. In other words, when the degree of restriction is higher, the working fluid is more difficult to flow. When the degree of restriction is lower, the working fluid more readily flows. Accordingly, when the degree of restriction is high and the flow amount is considerably restricted, the volume of the inter-piston chamber changes relatively slowly. On the other hand, when the degree of restriction is low and the flow amount is not so restricted, the volume of the inter-piston chamber changes relatively quickly. Hence, it is possible to change a rate of the volume change of the inter-piston chamber in accordance with a rate of retracting movement of the brake operation member, ensuring a relatively good operation feeling in the braking operation.

There may be employed, as the fluid-flow permission mechanism configured to change the degree of restriction of the flow amount, a throttle valve whose opening degree is adjustable, for instance. That is, where the throttle valve is employed, the degree of difficulty for the working fluid to flow can be changed by changing the opening degree. Alternatively, there may be employed, as the fluid-flow permission mechanism, an open/close valve simply configured to be opened and closed. Where such an open/close valve is employed, the degree of difficulty for the working fluid to flow can be changed by changing a valve opening time length during which the open/close valve is opened, while permitting the valve to be opened and closed in a relatively short time length, for instance.

(5) The hydraulic brake system according to the form (4), wherein the retract-operation control portion controls, in the retract-operation control, the fluid-flow permission mechanism to change the degree of restriction of the flow amount of the working fluid between the inter-piston chamber and the low-pressure source.

In the hydraulic brake system according to this form, the degree of restriction of the flow amount of the working fluid is changed by the operation of the fluid-flow permission mechanism. Accordingly, when the brake operation member is retracted relatively slowly, the fluid-flow permission mechanism is controlled such that the degree of restriction is high, thereby slowly changing the volume of the inter-piston chamber. On the other hand, when the brake operation member is retracted relatively quickly, the fluid-flow permission mechanism is controlled such that the degree of restriction is low, thereby quickly changing the volume of the inter-piston chamber. Thus, according to the hydraulic brake system, the degree of restriction of the flow amount can be changed by a relatively simple method, namely, by controlling the fluid-flow permission mechanism.

(6) The hydraulic brake system according to the form (4) or (5), wherein the retract-operation control portion includes a restriction-degree determining portion that determines the degree of restriction of the flow amount of the working fluid between the inter-piston chamber and the low-pressure source based on an operation amount of the brake operation member, and wherein the retract-operation control portion restricts, in the retraction-operation control, the flow amount of the working fluid between the inter-piston chamber and the low-pressure source in accordance with the degree of restriction of the flow amount of the working fluid between the inter-piston chamber and the low-pressure source determined by the restriction-degree determining portion.

In the hydraulic brake system according to this form, the degree of restriction of the flow amount is changed on the basis of the operation amount of the operation member. Accordingly, the restriction-degree determining portion may determine a certain target value on the basis of the operation amount, and the degree of restriction may be determined on the basis of a deviation from the target value, for instance. Where the deviation is large, the restriction-degree determining portion may determine the degree of restriction so as to be low, such that the deviation is quickly lessened. Where the deviation is small, the restriction-degree determining portion may determine the degree of restriction so as to be high, such that the deviation is gradually lessened. In the hydraulic brake system, therefore, there may be employed a certain index value that changes on the basis of the operation amount of the brake operation member, for determining the amount of the deviation, for instance. In this instance, the restriction-degree determining portion may determine the degree of restriction of the flow amount of the working fluid such that the index value becomes close to or equal to the target value. Accordingly, there may be employed, as the target value or the index value, a value that changes on the basis of the operation amount of the brake operation member, such as the master pressure, the volume of the inter-piston chamber, or the spacing distance between the pressurizing piston and the input piston. In the hydraulic brake system, therefore, the degree of restriction of the flow amount can be determined by a relatively simple method by use of a certain value that changes on the basis of the operation amount or the operation amount.

The "operation amount" of the brake operation member may be regarded as a movement amount of the brake operation member from a certain reference position. In this sense, the operation amount may be regarded as an operation position. In general, the reference position may be regarded as the initial position, namely, a position at which the brake operation member is located when not being operated, and the operation amount may be regarded as a movement amount of the operation member from the initial position.

(7) The hydraulic brake system according to the form (6), wherein the restriction-degree determining portion determines the degree of restriction of the flow amount of the working fluid between the inter-piston chamber and the low-pressure source, such that a spacing distance between the pressurizing piston and the input piston becomes equal to a spacing distance set in accordance with the operation amount of the brake operation member.

In the hydraulic brake system according to this form, the degree of restriction of the flow amount of the working fluid between the inter-piston chamber and the low-pressure source can be changed such that the spacing distance becomes equal to the spacing distance set in accordance with the operation amount. That is, in the hydraulic brake system, an actual spacing distance is the above-indicated index value, and the spacing distance set as described above is the above-indicated target value, namely, a target spacing distance. According to the hydraulic brake system, when the actual spacing distance is largely deviated from the target spacing distance set in accordance with the operation amount, the degree of restriction may be determined so as to be low, for thereby quickly lessening the deviation. On the other hand, when the actual spacing distance is not so largely deviated from the target spacing distance, the degree of restriction may be determined so as to be high, for thereby gradually lessening the deviation. The actual spacing distance can be made closer to the target spacing distance while thus changing the degree of restriction. According to the hydraulic brake system, the degree of restriction of the flow amount can be determined by a relatively simple method by use of the spacing distance. In view of the above-indicated relationship between: the volume of the inter-piston chamber; and the spacing distance between the pressurizing piston and the input piston, it may be considered that, in the hydraulic brake system, the restriction-degree determining portion is configured to determine the degree of restriction of the flow amount of the working fluid between the inter-piston chamber and the low-pressure source such that the volume of the inter-piston chamber becomes equal to a volume set in accordance with the operation amount of the brake operation member.

(8) The hydraulic brake system according to the form (6) or (7), wherein the restriction-degree determining portion estimates, based on the operation amount of the brake operation member, an operation-amount-based pressure that is a pressure of the working fluid to be supplied to the brake device, according to a predetermined relationship between the operation amount of the brake operation member and the operation-amount-based pressure, and wherein the restriction-degree determining portion determines the degree of restriction of the flow amount of the working fluid between the inter-piston chamber and the low-pressure source based on a deviation of the pressure of the working fluid to be supplied to the brake device from the operation-amount-based pressure.

In the master cylinder device of the present brake system, the master pressure is increased by the forward movement of the pressurizing piston and is decreased by the rearward movement thereof. That is, there exists a certain relationship between the level of the master pressure and the position of the pressurizing piston. Accordingly, by changing the degree of restriction of the flow amount of the working fluid based on the deviation of the master pressure from the operation-amount-based pressure, the volume of the inter-piston chamber changes in accordance with the change in the flow amount and the position of the pressurizing piston accordingly changes, so that the master pressure changes.

In the present hydraulic brake system, the fluid-flow permission mechanism can be controlled such that the master pressure, namely, the pressure of the working fluid to be supplied to the brake device, becomes equal to the operation-amount-based pressure, for instance. Accordingly, by determining the degree of restriction of the flow amount of the working fluid such that the deviation becomes equal to 0, namely, such that the master pressure becomes equal to the operation-amount-based pressure and by restricting the flow amount of the working fluid, for instance, the spacing distance between the pressurizing piston and the input piston can be made close to the target spacing distance set in accordance with the operation amount of the brake operation member while changing the degree of restriction of the flow amount in accordance with the amount of the deviation as described above. That is, in this case, the actual master pressure is the index value, and the degree of restriction of the flow amount is determined such that a deviation which is a difference between the master pressure and the operation-amount-based pressure becomes equal to 0, for permitting the master pressure to become equal to the operation-amount-based pressure as the target value. The relationship between the amount of the deviation and the degree of restriction to be determined is as follows. The restriction-degree determining portion may be configured to determine the degree of restriction so as to be low, for thereby quickly lessening the deviation where the deviation is large and configured to determine the degree of restriction so as to be high, for thereby gradually lessening the deviation where the deviation is small. According to the present hydraulic brake system, the degree of restriction of the flow amount can be determined by a relatively simple method by use of the master pressure.

The relationship between the operation amount and the operation-amount-based pressure is set in the form of a map or a mathematical relation, for instance. Such a map or a mathematical relation may be stored in the controller. The relationship between the operation amount and the operation-amount-based pressure may be always constant or may change depending upon situations. Where the present hydraulic brake system is installed on a vehicle equipped with the regenerative brake, such as a hybrid vehicle or an electric vehicle, for instance, the braking force to be generated in the hydraulic brake changes depending upon the braking force being generated by the regenerative brake. In such an instance, the relationship between the operation amount and the operation-amount-based pressure may be set so as to change in accordance with the braking force to be generated in the hydraulic brake.

(9) The hydraulic brake system according to the form (6) or (7), wherein the restriction-degree determining portion estimates, based on the operation amount of the brake operation member, an operation-amount-based spacing distance that is a distance by which the pressurizing piston and the input piston should be spaced apart from each other, according to a predetermined relationship between the operation amount of the brake operation member and the operation-amount-based spacing distance, and wherein the restriction-degree determining portion determines the degree of restriction of the flow amount of the working fluid between the inter-piston chamber and the low-pressure source based on a deviation of the operation amount of the brake operation member from the estimated operation-amount-based spacing distance.

As described above, there exists a certain relationship between the level of the master pressure and the movement amount of the pressurizing piston, and the movement amount of the input piston connected to the brake operation member can be estimated from the operation amount. Accordingly, the spacing distance can be estimated from the thus estimated position of the pressurizing piston and position of the input piston. Where the master pressure is controlled by the input-pressure control portion so as to be equal to a pressure that is determined on the basis of the operation amount of the brake operation member, there is established a certain relationship between the operation amount and the master pressure, namely, the position of the pressurizing piston, and there is established, by the relationship, a certain relationship between the operation amount and the operation-amount-based spacing distance. Accordingly, by determining the degree of restriction of the flow amount of the working fluid such that the deviation becomes equal to 0, namely, such that the spacing distance becomes equal to the operation-amount-based spacing distance and by restricting the flow amount of the working fluid, for instance, the spacing distance between the pressurizing piston and the input piston can be made close to the target spacing distance set in accordance with the operation amount of the brake operation member while changing the degree of restriction of the flow amount in accordance with the amount of the deviation. That is, in this case, the operation-amount-based spacing distance is the target spacing distance. In other words, in this case, the actual spacing distance is the index value, and the degree of restriction of the flow amount is determined such that a deviation which is a difference between the spacing distance and the target spacing distance becomes equal to 0, for permitting the spacing distance to become equal to the target spacing distance as the target value. According to the present hydraulic brake system, the degree of restriction of the flow amount can be determined by a relatively simple method by use of the spacing distance.

Like the relationship between the operation amount and the operation-amount-based pressure explained above, the relationship between the operation amount and the operation-amount-based spacing distance is set in the form of a map or a mathematical relation. Such a map or a mathematical relation may be stored in the restriction-degree determining portion. The relationship between the operation amount and the operation-amount-based spacing distance may be always constant or may change depending upon situations.

(10) The hydraulic brake system according to the form (6) or (7), wherein the restriction-degree determining portion estimates, based on the operation amount of the brake operation member, an operation-amount-based volume that is a volume the inter-piston chamber should have, according to a predetermined relationship between the operation amount of the brake operation member and the operation-amount-based volume, and wherein the restriction-degree determining portion determines the degree of restriction of the flow amount of the working fluid between the inter-piston chamber and the low-pressure source based on a deviation of the operation amount of the brake operation member from the estimated operation-amount-based volume.

The hydraulic brake system according to this form may be regarded as a modification of the above-indicted hydraulic brake system in which the degree of restriction of the flow amount is determined by use of the spacing distance. That is, since the volume of the inter-piston chamber is a product obtained by multiplying the spacing distance between the pressurizing piston and the input piston by the cross-sectional area of the inter-piston chamber, the degree of restriction of the flow amount can be determined by use of the volume of the inter-piston chamber. According to the present hydraulic brake system, the degree of restriction of the flow amount can be determined by a relatively simple method by use of the volume of the inter-piston chamber, as in the hydraulic brake system explained above.

(11) The hydraulic brake system according to any one of the forms (4)-(7), wherein the fluid-flow permission mechanism has an electromagnetic open/close valve whose valve-opening time length is changed so as to change the degree of restriction of the flow amount of the working fluid between the inter-piston chamber and the low-pressure source, and wherein the retract-operation control portion controls the electromagnetic open/close valve to change the valve-opening time length of the electromagnetic open/close valve, thereby changing the degree of restriction of the flow amount of the working fluid between the inter-piston chamber and the low-pressure source.

In the hydraulic brake system according to this form, the degree of restriction of the flow amount of the working fluid is changed by changing the valve-opening time length of the electromagnetic open/close valve. The manner of changing the valve-opening time length is not particularly limited. For instance, the manner of changing the valve-opening time length may be a manner of changing a time length during which the valve is opened or may be a manner of changing the number of times in which a valve opening operation with a fixed valve-opening time length is repeated in a certain time period. Moreover, these manners may be combined. According to the hydraulic brake system, the degree of restriction of the flow amount can be changed by use of a relatively low-cost electromagnetic open/close valve, thereby preventing the cost of the hydraulic brake system from being increased. In this respect, where a time length during which the valve is opened in one valve opening is relatively long, the position of the input piston and the position of the pressurizing piston change rapidly, resulting in deterioration in the operation feeling in the braking operation. In view of this, the valve-opening time length in one valve opening is preferably a relatively short time length, e.g., about several milliseconds (msec).

(12) The hydraulic brake system according to any one of the forms (1)-(11), wherein the controller includes a re-advance-operation control portion that executes a re-advance-operation control in which the fluid-flow permission mechanism is controlled to shut off the flow of the working fluid between the inter-piston chamber and the low-pressure source, when the brake operation member is re-advanced during execution of the retraction-operation control.

In the hydraulic brake system according to this form, when the brake operation member is re-advanced from the state in which the flow of the working fluid between the inter-piston chamber and the low-pressure source is permitted in association with the retracting movement of the brake operation member as described above, the working fluid in the pressurizing chamber is pressurized with the inter-piston chamber hermetically closed. In other words, the working fluid in the pressurizing chamber is pressurized with the volume of the inter-piston chamber kept fixed, namely, with the spacing distance between the input piston and the pressurizing piston kept fixed. Hence, the working fluid in the pressurizing chamber is pressurized in the input-pressure-and-operation-force-dependent pressurizing state. Thus, in the hydraulic brake system, the working fluid can be pressurized, namely, the master pressure can be increased, with the inter-piston chamber hermetically closed. It is accordingly possible to obviate a situation in which the operation force is not transmitted to the pressurizing piston due to fluid communication between the inter-piston chamber and the low-pressure source, whereby the master pressure can be increased by effective use of the operation force.

(13) The hydraulic brake system according to the form (12), wherein the controller is configured such that the retract-operation control portion again executes the retract-operation control irrespective of whether the pressure of the working fluid to be supplied to the brake device is lower than the set pressure upon retracting, when the brake operation member is re-retracted during execution of the re-advance-operation control.

In the hydraulic brake system according to this form, when the operation member is re-retracted from the state in which the brake operation member is re-advanced as described above, the flow of the working fluid between the inter-piston chamber and the low-pressure source is permitted. That is, in the hydraulic brake system according to a combination of the previous form and this form, the inter-piston chamber is hermetically closed when the brake operation member is advanced after the retract-operation control has been executed once. Further, in the hydraulic brake system according to the combination, the flow of the working fluid between the inter-piston chamber and the low-pressure source is permitted when the brake operation member is re-retracted after the retract-operation control has been executed once. Therefore, the spacing distance between the pressurizing piston and the input piston can be changed when the brake operation member is being retracted, thereby enabling the driver to be less likely to feel uncomfortable or unnatural in the braking operation.

(14) The hydraulic brake system according to the form (13), wherein the controller is configured such that the retract-operation control portion again executes the retract-operation control on condition that the brake operation member has been retracted to an operation state at the time of initiation of the re-advance-operation control.

In the hydraulic brake system according to this form, even when the inter-piston chamber is hermetically closed by the re-advance-operation control after the retract-operation control has been executed once, the inter-piston chamber is kept hermetically closed until the brake operation member returns to its operation state at the time of initiation of the re-advance-operation control. According to the hydraulic brake system, even when the re-advance-operation control is executed, the degree of restriction of the flow amount of the working fluid can be changed on the basis of the same relationship as that between the braking operation amount and a hydraulic braking force when the re-advance-operation control is not executed, in the retracting movement of the brake operation member after the brake operation member has returned to the operation state at the time of initiation of the re-advance-operation control. In the hydraulic brake system, therefore, the operation feeling in the retract-operation control does not change depending upon whether or not the re-advance-operation control has been executed, thereby enabling the driver to be less likely to feel uncomfortable or unnatural. In this respect, the "state at the time of initiation of the re-advance-operation control" may be a state in which the operation amount of the brake operation member or the operation force becomes the operation amount or the operation force at the time of initiation of the re-advance-operation control.

DESCRIPTION OF EMBODIMENTS

There will be hereinafter explained in detail embodiments of the claimable invention with reference to drawings. It is to be understood that the claimable invention is not limited to the following embodiments and modified examples, but may be embodied with various changes and modifications based on the knowledge of those skilled in the art.

First Embodiment

<Structure of Vehicle>

Figure 1:
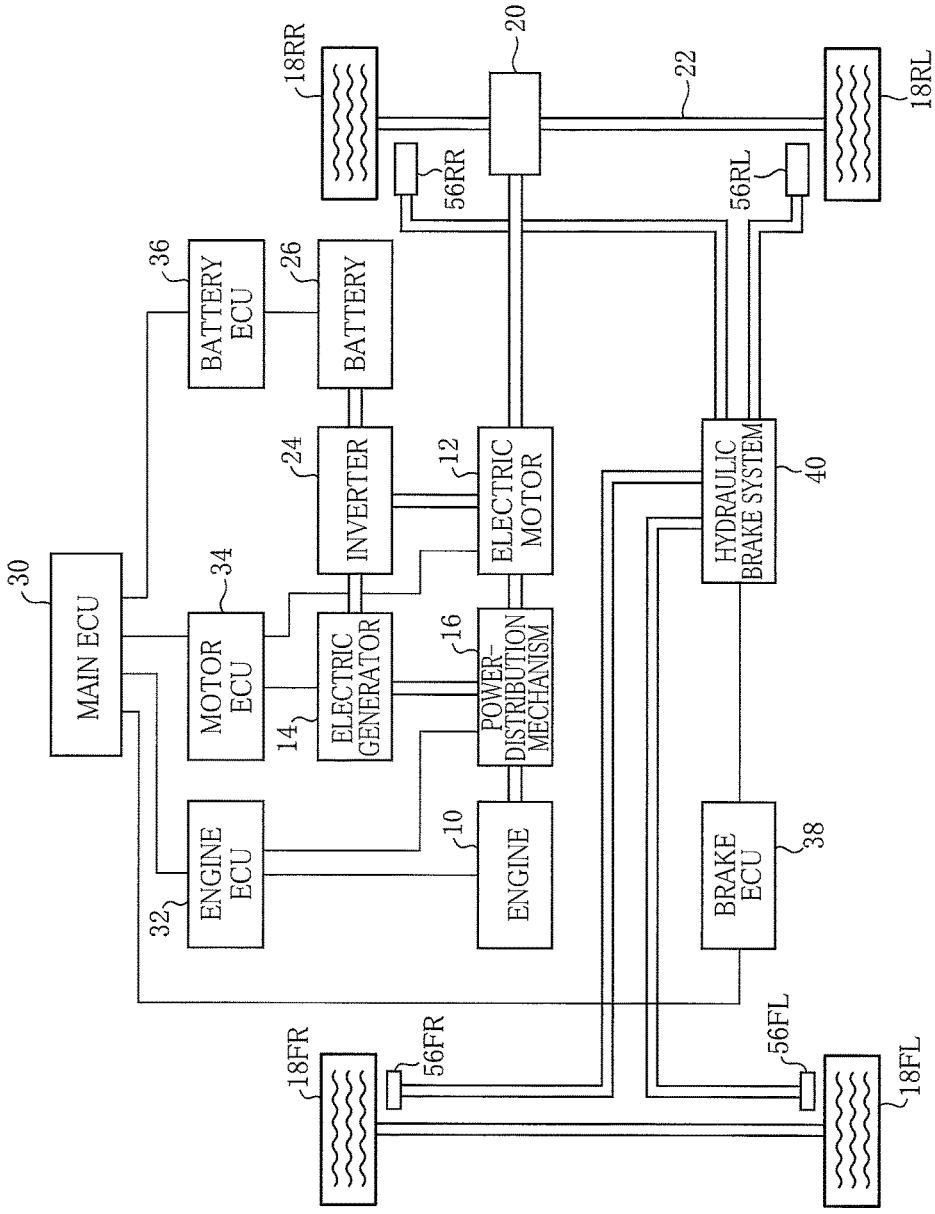
FIG. 1 is a schematic view showing a drive system and a brake system of a hybrid vehicle equipped with a hydraulic brake system according to a first embodiment of the claimable invention.

FIG. 1 schematically shows a drive system and a brake system of a hybrid vehicle equipped with a master cylinder device according to a first embodiment. The vehicle is equipped with an engine 10 and an electric motor 12, each as a power source, and is also equipped with an electric generator 14 for generating electricity by an output power of the engine 10. The engine 10, the electric motor 12, and the electric generator 14 are connected to one another via a power-distribution mechanism 16. By controlling the power-distribution mechanism 16, the output power of the engine 10 is divided into an output power for driving the electric generator 14 and an output power for rotating drive wheels among four wheels 18, and an output power of the electric motor 12 can be transmitted to the drive wheels. That is, the power-distribution mechanism 16 functions as a speed-change mechanism with respect to a driving power to be transmitted to the drive wheels via a speed reducer 20 and a drive shaft 22. Where it is necessary to indicate to which one of the four wheels each of some constituent elements such as "wheel 18" corresponds, there is attached, to a reference numeral of a constituent element, a suitable one of suffixes "FL", "FR", "RL", and "RR" respectively indicative of a front left wheel, a front right wheel, a rear left wheel, and a rear right wheel. According to the usage of the suffixes, the drive wheels of the vehicle are a wheel 18RL and a wheel 18RR.

The electric motor 12 is an alternating current (AC) synchronous motor and is driven by AC electricity. The vehicle is equipped with an inverter 24 configured to invert electricity of direct current to electricity of alternating current and vice versa. Accordingly, by controlling the inverter 24, electricity of alternating current generated by the electric generator 14 is inverted into electricity of direct current for charging a battery 26 and electricity of direct current that is charged in the battery 26 is inverted into electricity of alternating current for driving the electric motor 12. Like the electric motor 12, the electric generator 14 is configured as an alternating current (AC) synchronous motor. Accordingly, it may be considered that the vehicle of the present embodiment has two AC synchronous motors. One of them is the electric motor 12 used to mainly output the driving power, and the other of them is the electric generator 14 used to generate electricity mainly by the output power of the engine 10.

The electric motor 12 is configured to also generate (regenerate) electricity by utilizing rotation of the wheels 18RL, 18RR in association with running of the vehicle. In this instance, the electric motor 12 connected to the wheels 18RL, 18RR generates a resistance for restraining rotation of the electric motor 12 while generating electricity. Accordingly, it is possible to utilize the resistance as a braking force to brake the vehicle. That is, the electric motor 12 is utilized as a means for a regenerative brake for braking the vehicle while generating electricity. Thus, the vehicle is braked by controlling the regenerative brake together with an engine brake and a hydraulic brake that will be explained. On the other hand, the electric generator 14 generates electricity mainly by the output power of the engine 10 and functions also as an electric motor that operates by electricity supplied from the battery 26 via the inverter 24.

In the vehicle, the above controls of braking and other controls relating to the vehicle are executed by a plurality of electronic control units (ECU). Among the plurality of ECUs, a main ECU 30 has a function of supervising execution of the controls. For instance, the hybrid vehicle is configured to run by driving of the engine 10 and driving of the electric motor 12 that are controlled as a whole by the main ECU 30. More specifically, the main ECU 30 determines a ratio between the output power of the engine 10 and the output power of the electric motor 12. On the basis of the determined ratio, the main ECU 30 sends, to an engine ECU 32 for controlling the engine 10 and a motor ECU 34 for controlling the electric motor 12 and the electric generator 14, commands for respective controls.

To the main ECU 30 is also connected a battery ECU 36 for controlling the battery 26. The battery ECU 36 monitors a charge status of the battery 26 and sends a charge-request command to the main ECU 30 when the charge is short. When the main ECU 30 receives the charge-request command, the main ECU 30 sends, to the motor ECU 34, a command for electricity generation by the electric generator 14, so as to charge the battery 26.

To the main ECU 30 is also connected a brake ECU 38 for controlling the braking. The vehicle is provided with a brake operation member (hereinafter simply referred to as "operation member" where appropriate) that is operated by a driver. The brake ECU 38 determines a target braking force on the basis of a braking operation amount of the operation member (hereinafter simply referred to as "operation amount" where appropriate), namely, on the basis of a movement amount of the operation member from an initial position that is a position at which the operation member is located when not being operated. The brake ECU 38 sends the determined target braking force to the main ECU 30, and the main ECU 30 sends the target braking force to the motor ECU 34. On the basis of the target braking force, the motor ECU 34 controls the regenerative brake and sends, to the main ECU 30, an execution value of the regenerative brake, namely, a regenerative braking force that is being generated. In the main ECU 30, the regenerative braking force is subtracted from the target braking force, and a target hydraulic braking force to be generated in a hydraulic brake system 40 mounted on the vehicle is determined on the basis of the remainder of the subtraction of the regenerative braking force from the target braking force. The main ECU 30 sends the target hydraulic braking force to the brake ECU 38, and the brake ECU 38 controls the hydraulic brake system 40 such that a hydraulic braking force to be generated by the hydraulic brake system 40 becomes equal to the target hydraulic braking force.

<Structure of Hydraulic Brake System>

Figure 2:
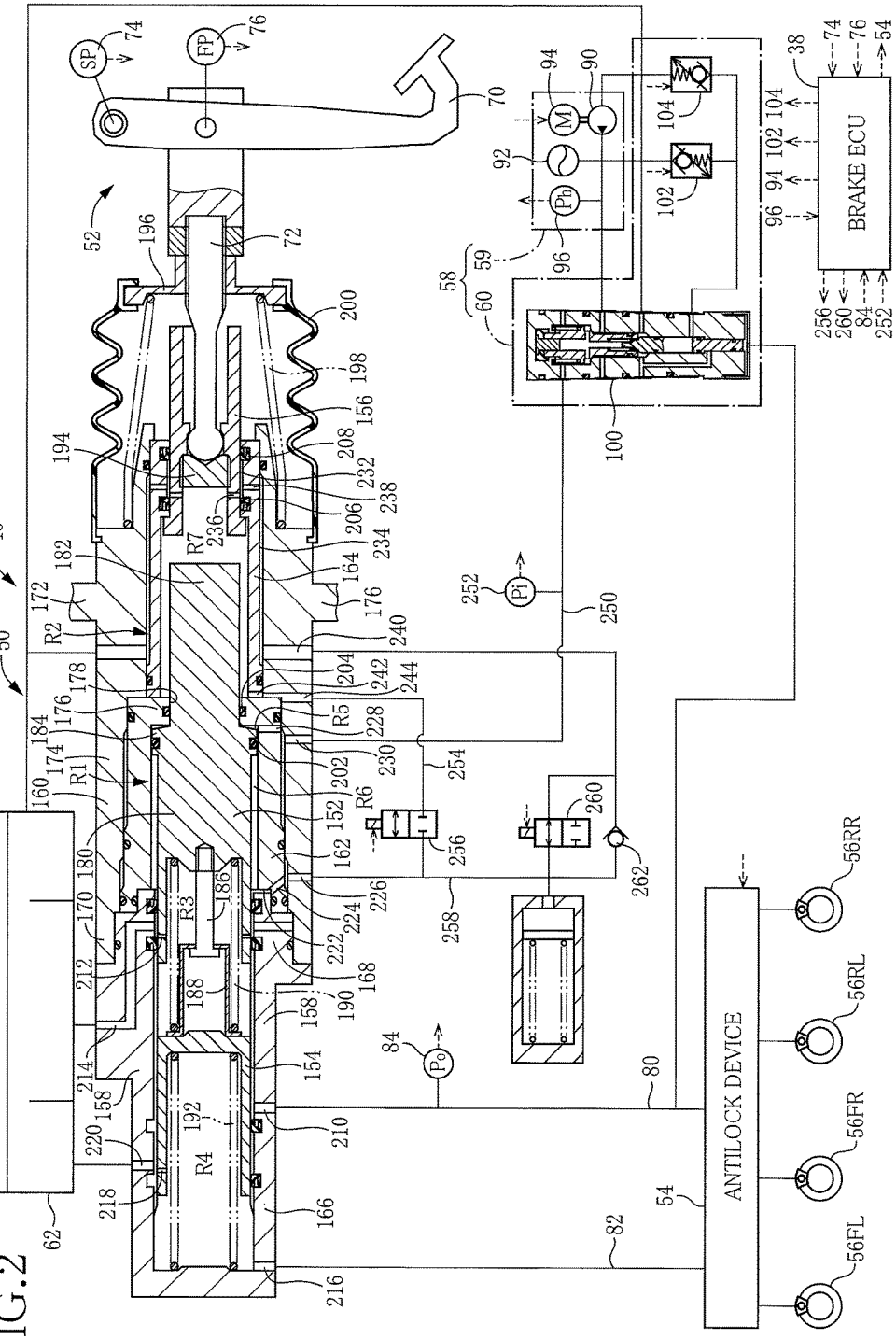
FIG. 2 is a view showing the hydraulic brake system according to the first embodiment.

Referring next to FIG. 2, the hydraulic brake system 40 mounted on the hybrid vehicle constructed as described above will be explained in detail. In the following explanation, terms such as "forward" and "rearward" are used to indicate leftward and rightward, respectively, in FIG. 2. Further, terms such as "front side", "front end", "forward movement (advancing movement)", "rear side", "rear end", "rearward movement (retracting movement)" are used similarly. In the following explanation, characters enclosed with square brackets [ ] represent sensors and the like in the drawings.

FIG. 2 schematically shows the hydraulic brake system 40 of the vehicle. The hydraulic brake system 40 has a master cylinder device 50 for pressurizing a working fluid. A driver of the vehicle can activate the master cylinder device 50 by operating an operating device 52 connected to the master cylinder device 50. The master cylinder device 50 pressurizes the working fluid by its own activation. The pressurized working fluid is supplied to each of brake devices 56 provided for the respective wheels via an antilock device 54 connected to the master cylinder device 50. Each brake device 56 generates a force for restraining rotation of the corresponding wheel 18, namely, the hydraulic braking force, in dependence on a pressure of the pressurized working fluid (hereinafter referred to as "master pressure" where appropriate).

The hydraulic brake system 40 has, as a high-pressure source, a high-pressure-source device 58 for increasing the pressure of the working fluid. The high-pressure-source device 58 includes a high-pressure generating device 59 for highly increasing the pressure of the working fluid and a pressure increasing/decreasing device 60 to which is supplied the working fluid whose pressure is highly increased by the high-pressure generating device 59. The pressure increasing/decreasing device 60 is configured to regulate the pressure of the working fluid that is highly increased by the high-pressure generating device 59 (hereinafter referred to as "high-pressure-source pressure" where appropriate) so as to be decreased to a level equal to or lower than the pressure. The pressure increasing/decreasing device 60 is configured to increase and decrease a pressure of the working fluid to be supplied to the master cylinder device 50 (hereinafter referred to as "input pressure" where appropriate). In other words, the input pressure is a pressure of the high-pressure-source pressure controlled by the pressure increasing/decreasing device 60 and may be referred to as a controlled high-pressure-source pressure. The master cylinder device 50 is operable by the increase and the decrease of the input pressure. The hydraulic brake system 40 has, as a low-pressure source, a reservoir 62 that stores the working fluid at an atmospheric pressure. The reservoir 62 is connected to the master cylinder device 50 and the high-pressure-source device 58.

The operating device 52 includes a brake pedal 70 as the brake operation member and an operation rod 72 connected to the brake pedal 70. The brake pedal 70 is pivotally held, at its upper end portion, by a body of the vehicle. The operation rod 72 is connected, at its rear end portion, to the brake pedal 70 and is connected, at its front end portion, to the master cylinder device 50. Further, the operating device 52 has an operation-amount sensor [SP] 74 for detecting the operation amount of the brake pedal 70 and an operation-force sensor [FP] 76 for detecting a braking operation force (hereinafter simply referred to as "operation force" where appropriate) that is a force applied to the operation member by the driver. The operation-amount sensor 74 and the operation-force sensor 76 are connected to the brake ECU 38, and the brake ECU 38 determines the target braking force on the basis of values detected by the sensors.

The brake devices 56 are connected to the master cylinder device 50 via fluid passages 80, 82. The fluid passages 80, 82 are for supplying, to the brake devices 56, the working fluid pressurized to the master pressure by the master cylinder device 50. A master-pressure sensor [Po] 84 is provided on the fluid passage 80. While not explained in detail, each brake device 56 includes a brake caliper, a wheel cylinder (brake cylinder) and brake pads attached to the brake caliper, and a brake disc that rotates together with the corresponding wheel. The fluid passages 80, 82 are connected to the brake cylinders of the corresponding brake devices 56. At a certain position in the fluid passages 80, 82, the antilock device 54 is disposed. The fluid passage 80 is connected to the brake devices 56RL, 56RR for the rear wheels while the fluid passage 82 is connected to the brake devices 56FL, 56FR for the front wheels. In each brake device 56, the brake cylinder presses the brake pads onto the brake disc in dependence on the master pressure, and there is generated the hydraulic braking force for restraining rotation of the corresponding wheel by friction caused by the pressing, so that the vehicle is braked.

The antilock device 54 is an ordinary device and, in short, has four pairs of open/close valves corresponding to the respective four wheels. One of the open/close valve in each pair is a pressure-increase open/close valve and is kept in an open state when the wheel is not locked while the other of the open/close valve in each pair is a pressure-decrease open/close valve and is kept in a closed state when the wheel is not locked. The antilock device 54 is configured such that, in order to release the lock of the wheel, the pressure-increase open/close valve shuts off a flow of the working fluid from the master cylinder device 50 to the brake device 56 and the pressure-decrease open/close valve permits a flow of the working fluid from the brake device 56 to the reservoir, when the wheel is locked.

The high-pressure generating device 59 includes: a hydraulic pump 90 that pumps up the working fluid from the reservoir 62 so as to increase the pressure of the working fluid; and an accumulator 92 in which is stored the pressure-increased working fluid. The hydraulic pump 90 is driven by an electric motor 94. The high-pressure generating device 59 further includes a high-pressure-source pressure sensor [Ph] 96 for detecting the pressure of the working fluid that is highly increased. The brake ECU 38 monitors values detected by the high-pressure-source pressure sensor 96, and the hydraulic pump 90 is drivingly controlled on the basis of the detected values, whereby the high-pressure generating device 59 constantly supplies, to the pressure increasing/decreasing device 60, the working fluid having a pressure that falls within a predetermined range.

The pressure increasing/decreasing device 60 includes: a pressure regulating valve device 100 configured to regulate, in accordance with the pressure of the working fluid introduced thereinto, the pressure of the working fluid supplied from the high-pressure generating device 59; a pressure-increase linear valve 102 connected to the high-pressure generating device 59; and a pressure-decrease linear valve 104 connected to the reservoir 62. The pressure regulating valve device 100 is connected to the pressure-increase linear valve 102 and the pressure-decrease linear valve 104. By activation of the pressure-increase linear valve 102 and the pressure-decrease linear valve 104, the pressure of the working fluid from the high-pressure generating device 59 is regulated, and the pressure-regulated working fluid is supplied to the pressure regulating valve device 100. The pressure regulating valve device 100 operates utilizing the pressure of the working fluid as a pilot pressure, thereby regulating the pressure of the working fluid from the high-pressure generating device 59 and supplying the pressure-regulated working fluid to the master cylinder device 50.

Figure 3:
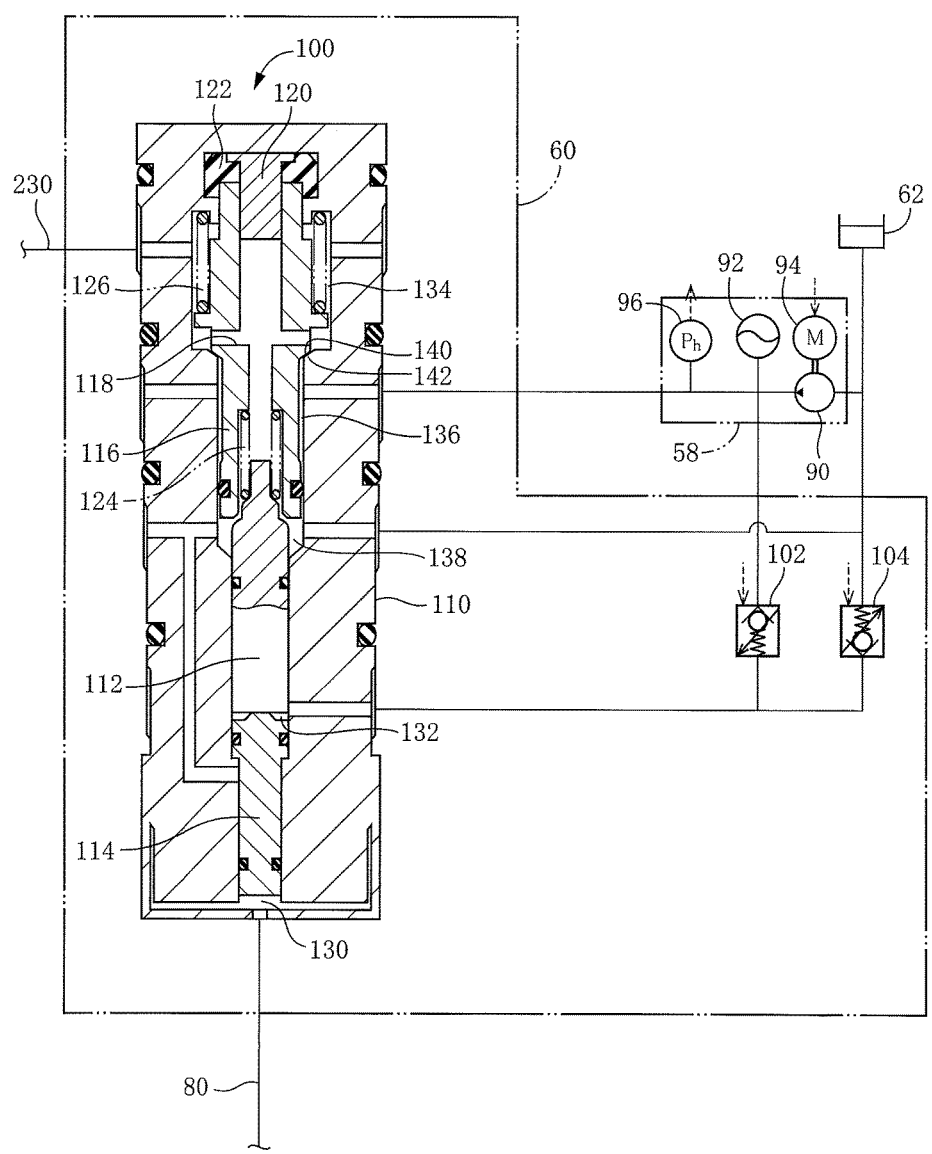
FIG. 3 is a view showing a pressure increasing/decreasing device in a high-pressure-source device of the hydraulic brake system shown in FIG. 2, the pressure increasing/decreasing device being for regulating a highly pressurized working fluid.

As shown in FIG. 3, the pressure regulating valve device 100 has: a housing 110 whose both ends are closed and which has a generally hollow cylindrical shape; a first plunger 112 disposed in the housing 110 and having a solid cylindrical shape; a second plunger 114 disposed below the first plunger 112 and having a solid cylindrical shape; and a pressure regulating pipe 116 disposed above the first plunger 112 and having a hollow cylindrical shape. The first plunger 112, the second plunger 114, and the pressure regulating pipe 116 are slidably fitted in the housing 110. The housing 110 has different inner diameters, so that steps are formed on the inner circumferential surface of the housing 110. The housing 110 generally has a larger inner diameter at a higher position. Each of the first plunger 112, the second plunger 114, and the pressure regulating pipe 116 has steps formed on its outer circumferential surface because of different outer diameters. The pressure regulating pipe 116 has a through-hole 118 formed therethrough in its axial and diametric directions and accordingly has openings of the through-hole 118 respectively formed in an upper end face, a lower end face, and a side face of the pressure regulating pipe 116. An upper end portion of the first plunger 112 is capable of being seated on the opening formed in the lower end face of the pressure regulating pipe 116. A pin 120 supported by an upper end face of the housing 110 is fitted into the opening formed in the upper end face of the pressure regulating pipe 116, and the pressure regulating pipe 116 is movable relative to the pin 120. Further, there is provided, above the pressure regulating pipe 116, an annular buffer rubber 122 for preventing the pressure regulating pipe 116 from coming into contact with the housing 110. A spring 124 that is a compression spring is provided between the first plunger 112 and the pressure regulating pipe 116. The spring 124 biases the first plunger 112 and the pressure regulating pipe 116 such that the first plunger 112 and the pressure regulating pipe 116 are spaced apart from each other. A spring 126 that is a compression spring is provided also between the pressure regulating pipe 116 and the housing 110. The spring 126 biases the pressure regulating pipe 116 downward.

In the housing 110, there are defined a plurality of fluid chambers defined by the inner circumferential surface and end faces of the housing 110, outer circumferential surfaces and end faces of the respective first plunger 112, second plunger 114, and pressure regulating pipe 116. More specifically, a first fluid chamber 130 is defined by a lower end face of the second plunger 114 and an inner bottom surface of the housing 110. A second fluid chamber 132 is defined between an upper end face of the second plunger 114 and a lower end face of the first plunger 112. The outer diameter of the pressure regulating pipe 116 is made considerably smaller at its upper portion than the inner diameter of the housing 110, whereby a third fluid chamber 134 is defined between the pressure regulating pipe 116 and the housing 110. Further, the outer diameter of the pressure regulating pipe 116 is made slightly smaller at its lower portion than the inner diameter of the housing 110, whereby a fourth fluid chamber 136 is defined between the pressure regulating pipe 116 and the housing 110. In addition, a fifth fluid chamber 138 is defined by the outer circumferential surface of an upper portion of the first plunger 112, the lower end face of the pressure regulating pipe 116, and the inner circumferential surface of the housing 110.

These fluid chambers communicate with the exterior through communication holes formed in the housing 110. More specifically, the first fluid chamber 130 is connected to a fluid passage that branches off from the fluid passage 80, and the working fluid pressurized by the master cylinder device 50 to the master pressure is supplied to the first fluid chamber 130. The second fluid chamber 132 is connected to the pressure-increase linear valve 102 and the pressure-decrease linear valve 104, and the working fluid in the second fluid chamber 132 has a pressure regulated by the pressure-increase linear valve 102 and the pressure-decrease linear valve 104. The fourth fluid chamber 136 is connected to the high-pressure generating device 59, and the working fluid in the fourth fluid chamber 136 has the high-pressure-source pressure. The fifth fluid chamber 138 is connected to the reservoir 62, and the working fluid in the fifth fluid chamber 138 has the atmospheric pressure. The pressure of the working fluid in the third fluid chamber 134 is regulated by activation of the pressure regulating valve device 100 as later explained. The third fluid chamber 134 is connected to the master cylinder device 50, and the pressure-regulated working fluid is input to the master cylinder device 50. That is, the pressure of the working fluid in the third fluid chamber 134 is an input pressure of the master cylinder device 50.

The pressure of the working fluid in the third fluid chamber 134 is normally regulated in accordance with a pressure of the working fluid supplied to the second fluid chamber 132 (hereinafter referred to as "controlling fluid pressure" where appropriate). The controlling fluid pressure is increased and decreased by controlling electricity supplied to the pressure-increase linear valve 102 and the pressure-decrease linear valve 104. The pressure-increase linear valve 102 is configured to be closed when no electricity is supplied thereto, namely, the pressure-increase linear valve 102 is configured such that a pressure necessary for opening the valve 102 is the highest when no electricity is supplied thereto and such that a pressure at which the valve 102 is opened becomes lower with an increase in electricity supplied thereto. On the other hand, the pressure-decrease linear valve 104 is configured to be opened when no electricity is supplied thereto, namely, the pressure-decrease linear valve 104 is configured such that pressure necessary for closing the valve 104 is the lowest when no electricity is supplied thereto and such that a pressure at which the valve 104 is closed becomes higher with an increase in electricity supplied thereto. Each of the thus constructed pressure-increase linear valve 102 and pressure-decrease linear valve 104 is controlled such that a valve opening pressure of the pressure-decrease linear valve 104 is slightly higher than a valve opening pressure of the pressure-increase linear valve 102. Accordingly, in the pressure regulating valve device 100, when the controlling fluid pressure becomes lower than the valve opening pressure of the pressure-increase linear valve 102, the pressure-increase linear valve 102 is opened so as to increase the controlling fluid pressure. When the controlling fluid pressure becomes higher than the valve opening pressure of the pressure-decrease linear valve 104, the pressure-decrease linear valve 104 is opened so as to decrease the controlling fluid pressure. In other words, the controlling fluid pressure is kept between the valve opening pressure of the pressure-increase linear valve 102 and the valve opening pressure of the pressure-decrease linear valve 104, whereby the controlling fluid pressure is controlled to an arbitrary level.

When the controlling fluid pressure is increased as described above, the first plunger 112 moves upward against an elastic force of the coil spring 124 so as to be seated on the opening of the through-hole 118 formed at the lower end of the pressure regulating pipe 116. (This opening will be hereinafter referred to as "fifth-fluid-chamber-side opening" where appropriate.) When the first plunger 112 moves further upward, the pressure regulating pipe 116 also moves upward, whereby a stepped surface 140 formed on outer circumferential surface of the pressure regulating pipe 116 is separated away from a stepped surface 142 formed on the inner circumferential surface of the housing 110. As a result, the working fluid is permitted to flow from the fourth fluid chamber 136 to the third fluid chamber 134, so that the pressure of the working fluid in the third chamber is increased. When the controlling fluid pressure is decreased, the stepped surface 140 of the pressure regulating pipe 116 is seated on the stepped surface 142 of the housing 110 with the first plunger 112 being seated on the fifth-fluid-chamber-side opening. When the controlling fluid pressure is further decreased, the first plunger 112 is separated away from the fifth-fluid-chamber-side opening, whereby the third fluid chamber 134 is brought into communication with the reservoir 62 via the fifth fluid chamber 138. In other words, the pressure increasing/decreasing device 60 functions as a pressure regulator configured such that the pressure-increase linear valve 102 and the pressure-decrease linear valve 104 are controlled to decrease the pressure of the working fluid supplied from the high-pressure generating device 59, to a pressure according to the control and such that the working fluid having the decreased pressure is supplied to the master cylinder device 50.

The pressure regulating valve device 100 enables the pressure of the working fluid in the third fluid chamber 134 to be increased and decreased in dependence on the pressure of the working fluid in the first fluid chamber 130, namely, in dependence on the master pressure by activation of the master cylinder device 50, when no electricity is being supplied to the pressure-increase linear valve 102 and the pressure-decrease linear valve 104. That is, when the pressure of the working fluid in the first fluid chamber 130 increases, the second plunger 114 moves upward, whereby the first plunger 112 also moves upward. When the pressure of the working fluid in the first fluid chamber 130 decreases, the second plunger 114 moves downward, whereby the first plunger 112 also moves downward. Accordingly, the pressure of the working fluid in the third fluid chamber 134 is increased and decreased as described above in association with the increase and decrease of the pressure of the working fluid in the first fluid chamber 130. In other words, the pressure regulating valve device 100 can operate utilizing the master pressure as the pilot pressure and has a pilot-pressure-dependent pressure decreasing mechanism for decreasing the high-pressure-source pressure of the working fluid to a pressure in accordance with the pilot-pressure.

<Structure of Master Cylinder Device>

The master cylinder device 50 has a housing 150 as a casing, a first pressurizing piston 152 and a second pressurizing piston 154 for pressurizing the working fluid to be supplied to the brake device 56, and an input piston 156 to which an operation of the driver is input through the operating device 52. FIG. 2 shows a state in which the master cylinder device 50 is not activated, namely, a state in which a braking operation is not performed.

The housing 150 mainly includes four members, more specifically, a first housing member 158, a second housing member 160, a third housing member 162, and a fourth housing member 164. The first housing member 158 has a generally cylindrical shape whose front end is closed. The first housing member 158 is sectioned into two portions having mutually different outer diameters, namely, a front small-diameter portion 166 located on the front side and having a small outer diameter and a rear large-diameter portion 168 located on the rear side and having a larger outer diameter than the front small-diameter portion 166. The second housing member 160 has a generally cylindrical shape and is sectioned into three portions having mutually different inner diameters, namely, a front large-diameter portion 170 located on the front side and having a large inner diameter, a rear small-diameter portion 172 located on the rear side and having a small inner diameter, and an intermediate portion 174 located between the front large-diameter portion 170 and the rear small-diameter portion 172 and having an inner diameter intermediate between those of the front large-diameter portion 170 and the rear small-diameter portion 172. A rear end portion of the rear large-diameter portion 168 of the first housing member 158 is fitted into the front large-diameter portion 170, whereby the second housing member 160 is made integral with the first housing member 158. A flange 176 is formed on the outer circumferential surface of the second housing member 160. The master cylinder device 50 is fixed to the body of the vehicle at the flange 176.

The third housing member 162 having a cylindrical shape is fitted between a rear end face of the first housing member 158 and a stepped surface formed between the rear small-diameter portion 172 and the intermediate portion 174 of the second housing member 160. The third housing member 162 has the cylindrical shape having an inner flange 176 formed at a rear end portion thereof. The inner flange 176 defines a through-hole 178 at the rear end portion of the third housing member 162. The fourth housing member 164 having a cylindrical shape is fitted between a rear end face of the third housing member 162 and a rear end portion of the second housing member 160. The interior of the thus structured housing 150 is sectioned by the inner flange 176 of the second housing member 160 into a front-side chamber R1 located on the front side and a rear-side chamber R2 located on the rear side. That is, the inner flange 176 serves as a partition portion that partitions the interior of the housing 150, and the through-hole 178 is an opening of the partition portion.

The second pressurizing piston 154 has a cylindrical shape whose rear end is closed. The second pressurizing piston 154 is slidably fitted with seals into the first housing member 158 within the front-side chamber R1. The first pressurizing piston 152 includes: a main body portion 180 which is disposed in the front-side chamber R1 and whose rear end is closed; and an extension portion 182 that extends from a rear end portion of the main body portion 180 into the rear-side chamber R2 through the through-hole 178. A flange 184 is formed on an outer circumference of the rear end portion of the main body portion 180. The first pressurizing piston 152 is fitted with seals into the housing 150 such that a front portion of the main body portion 180 is slidable with respect to the first housing member 158, the flange 184 is slidable with respect to the inner circumferential surface of the third housing member 162, and the extension portion 182 is slidable with respect to the through-hole 178 of the third housing member 162. The input piston 156 is disposed in the rear-side chamber R2 and is fitted with seals into the fourth housing member 164 on the rear side of the extension portion 182 of the first pressurizing piston 152.

On the front side of the first pressurizing piston 152 and between the first pressurizing piston 152 and the second pressurizing piston 154, there is defined a first pressurizing chamber R3 for pressurizing the working fluid to be supplied to the brake devices 56RL, RR provided for the respective two rear wheels. Further, on the front side of the second pressurizing piston 154, there is defined a second pressurizing chamber R4 for pressurizing the working fluid to be supplied to the brake devices 56FL, FR provided for the respective two front wheels. In the first pressurizing piston 152, a headed pin 186 is screwed so as to extend from the bottom of the blind hole that is open on the front side. A pin-retaining tube 188 is fixed to a rear end face of the second pressurizing piston 154. A distance by which the first pressurizing piston 152 and the second pressurizing piston 154 are spaced apart from each other is limited so as to be held within a predetermined range by the headed pin 186 and the pin-retaining tube 188. In the first pressurizing chamber R3 and the second pressurizing chamber R4, there are respectively disposed compression coil springs (hereinafter each referred to as "return spring" where appropriate) 190, 192. The first pressurizing piston 152 and the second pressurizing piston 154 are biased rearward by the springs while being biased in directions in which the pistons 152, 154 separate away from each other. The first pressurizing piston 152 is restricted from moving rearward by contact of the rear end portion of the main body portion 180 with a front end face of the inner flange 176 of the third housing member 162.

The input piston 156 has a generally cylindrical shape. The operation rod 72 is connected to a separation wall 194 provided in the input piston 156, so as to transmit the operation force of the brake pedal 70 to the input piston 156 and so as to move the input piston 156 forward and rearward in accordance with the operation amount of the brake pedal 70. A flange is formed on the outer circumference of a front end portion of the input piston 156. The input piston 156 is restricted from moving rearward by engagement of the flange with the fourth housing member 164. A disc-like spring seat 196 is attached to the operation rod 72, and a compression coil spring (hereinafter referred to as "return spring" where appropriate) 198 is disposed between the spring seat 196 and the second housing member 160. The operation rod 72 is biased rearward by the return spring 198. A boot 200 is provided between the spring seat 196 and the housing 150 so as to protect a rear portion of the master cylinder device 50 from dust.

In the thus constructed master cylinder device 50, there is defined, between the flange 184 of the main body portion 180 of the first pressurizing piston 152 and the inner flange 176 of the third housing member 162, a fluid chamber (hereinafter referred to as "input chamber" where appropriate) R5 to which the working fluid is supplied from the high-pressure-source device 58. On the front side of the flange 184, there is defined, between the inner circumferential surface of the third housing member 162 and the outer circumferential surface of the first pressurizing piston 152, an annular fluid chamber (hereinafter referred to as "opposing chamber" where appropriate) R6. The opposing chamber R6 is opposed to the input chamber R5 with the flange 184 interposed therebetween. In a state in which no braking operation is made, there is provided a space between a rear end face of the extension portion 182 of the first pressurizing piston 152 that extends into the rear-side chamber R2 utilizing the through-hole 178 and a front end face of the input piston 156. In other words, the first pressurizing piston 152 and the input piston 156 are opposed to each other with the space interposed therebetween. An inter-piston chamber R7 is defined around the extension portion 182 so as to include the space. In the first pressurizing piston 152, a pressure receiving area on which a pressure of the working fluid in the inter-piston chamber R7 acts so as to cause the first pressurizing piston 152 to generate a forward biasing force, namely, an area of the rear end face of the extension portion 182, is made equal to a pressure receiving area on which a pressure of the working fluid in the opposing chamber R6 acts so as to cause the first pressurizing piston 152 to generate a rearward biasing force, namely, an area of the front end face of the flange 184.

In the master cylinder device 50 in which the fluid chambers are defined as described above, the input chamber R5 is defined such that the first pressurizing piston 152 contacts an inner circumferential surface of the second housing member 160 via a seal 202 embedded in an outer circumferential surface of the flange 184 and such that the first pressurizing piston 152 contacts an inner circumferential surface that defines the through-hole 178 of the third housing member 162 via a seal 204 embedded in the inner circumferential surface. The input piston 156 is held in sliding contact with an inner circumferential surface of the fourth housing member 164, and seals 206, 208 are embedded in the inner circumferential surface of the fourth housing member 164 at its rear end portion.

The first pressurizing chamber R3 communicates with the fluid passage 80 connected to the antilock device 54, via a communication hole 210 provided in the first housing member 158, and is fluidly communicable with the reservoir 62 via a communication hole 212 provided in the first pressurizing piston 152 and a communication hole 214 provided in the first housing member 158. On the other hand, the second pressurizing chamber R4 communicates with the fluid passage 82 connected to the antilock device 54 via a communication hole 216 provided in the first housing member 158, and is fluidly communicable with the reservoir 62 via a communication hole 218 provided in the second pressurizing piston 154 and a communication hole 220 provided in the first housing member 158.

In the first housing member 158, there is provided a communication hole 222 whose one end is open to the opposing chamber R6. In the third housing member 162, there is provided a communication hole 224 whose one end is open so as to be opposed to the other end of the communication hole 222. In the second housing member 160, there is provided a communication hole 226 whose one end is open so as to be opposed to the other end of the communication hole 224 and whose other end is open to the exterior. That is, the opposing chamber R6 communicates with the exterior via the communication holes 222, 224, 226. In the third housing member 162, there is provided a communication hole 228 whose one end is open to the input chamber R5. In the second housing member 160, there is provided a communication hole 230 whose one end is open so as to be opposed to the other end of the communication hole 228 and whose other end is open to the exterior. That is, the input chamber R5 communicates with the exterior via communication holes 228, 230.

The fourth housing member 164 has, at a part of its rear end portion, an inner diameter that is slightly larger than an outer diameter of a circumferential wall of the input piston 156, whereby a fluid passage 232 is defined between the rear end portion and the circumferential wall of the input piston 156. Owing to a difference between the outer diameter of the fourth housing member 164 and the inner diameter of the second housing member 160, there is defined a fluid passage 234 between an outer circumferential surface of the fourth housing member 164 and an inner circumferential surface of the second housing member 160. There is formed, in the circumferential wall of the input piston 156, a communication hole 236 whose one end is open to the inter-piston chamber R7 and whose other end is open to the fluid passage 232. In the fourth housing member 164, there is provided, between the seal 206 and the seal 208, a communication hole 238 whose one end is open to the fluid passage 232 and whose other end is open to the fluid passage 234. In the second housing member 160, there is provided a communication hole 240 whose one end is open to the fluid passage 234 and whose other end is open to the exterior. In other words, the inter-piston chamber R7 communicates with the exterior via the communication hole 236, the fluid passage 232, the communication hole 238, the fluid passage 234, and the communication hole 240.

At a front end portion of the fourth housing member 164, there is provided a communication hole 242 whose one end is open to the inter-piston chamber R7. In the second housing member 160, there is provided a communication hole 244 whose one end is open so as to be opposed to the other end of the communication hole 242 and whose other end is open to the exterior.

In the master cylinder device 50 in which the communication holes are provided as described above, there is connected, to the communication hole 230, the other end of an input pressure passage 250 whose one end is connected to the pressure increasing/decreasing device 60, namely, connected to the third fluid chamber 134 of the pressure regulating valve device 100. Accordingly, the working fluid having a pressure regulated by the pressure regulating valve device 100 is supplied to the input chamber R5. It is noted that, at a certain position in the input pressure passage 250, an input pressure sensor [Pi] 252 is disposed for detecting a pressure of the working fluid in the input chamber R5.

One end of an external communication passage 254 is connected to the communication hole 226 while the other end of the external communication passage 254 is connected to the communication hole 244. In the master cylinder device 50, therefore, the external communication passage 254 serves as an inter-chamber communication passage by which the opposing chamber R6 and the inter-piston chamber R7 communicate with each other. Further, at a certain position in the external communication passage 254, there is disposed an electromagnetic open/close valve 256 that is a normally closed valve configured to be closed when no electricity is supplied thereto. A low pressure passage 258 branches off from the external communication passage 254 at a position between the one end thereof connected to the communication hole 226 and the open/close valve 256. The low pressure passage 258 communicates with the reservoir 62 via the communication hole 240. At a certain position in the low pressure passage 258, there is disposed an electromagnetic open/close valve 260 that is a normally open valve configured to be opened when no electricity is supplied thereto. Accordingly, the opposing chamber R6 and the inter-piston chamber R7 is fluidly communicable with the reservoir 62. In the low pressure passage 258, a check valve 262 is disposed in parallel with the open/close valve 260 for preventing the pressures of the working fluid in the opposing chamber R6 and the inter-piston chamber R7 from becoming negative with respect to the pressure of the working fluid in the reservoir 62.

Figure 4:
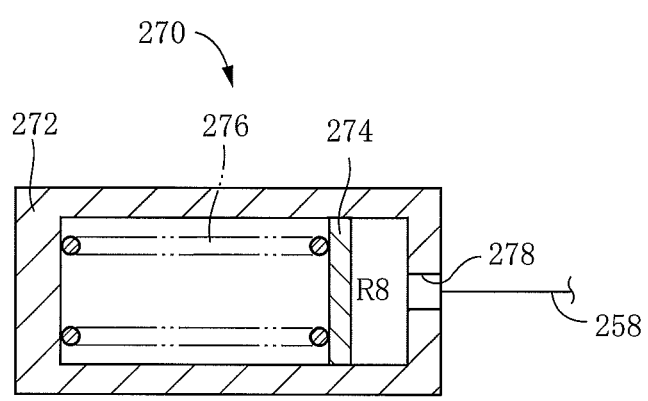
FIG. 4 is a view showing a reaction-force applying mechanism employed in the hydraulic brake system shown in FIG. 2.

In the low pressure passage 258, there is provided a reaction-force generating device 270 between: a position at which the low pressure passage 258 branches off from the external communication passage 254; and the open/close valve 260. The working fluid from the master cylinder device 50 flows into and out of the reaction-force generating device 270. FIG. 4 is a cross-sectional view of the reaction-force generating device 270. The reaction-force generating device 270 includes a housing 272 as a casing, and a piston 274 and a compression coil spring 276 that are disposed in the housing 272. The housing 272 has a cylindrical shape whose opposite ends are closed. The piston 274 has a disc-like shape and is disposed so as to be slidable on an inner circumferential surface of the housing 272. The spring 276 is supported at one end thereof by an inner bottom surface of the housing 272 and at the other end thereof by one end face of the piston 274. Accordingly, the piston 274 is elastically supported by the housing 272 owing to the spring 276. A storage chamber R8 is defined in the housing 272 by the other end face of the piston 274 and the housing 272. In the housing 272, there is provided a communication hole 278 whose one end is open to the storage chamber R8. To the other end of the communication hole 278, a fluid passage that branches off from the low pressure passage 258 is connected. Accordingly, the storage chamber R8 is fluidly communicable to the opposing chamber R6 and the inter-piston chamber R7. In the arrangement, where a total volume of the opposing chamber R6 and the inter-piston chamber R7 decreases in a state in which the open/close valve 260 is closed, a volume of the storage chamber R8 of the reaction-force generating device 270 increases in accordance with the decrease and the spring 276 generates an elastic reaction force having a magnitude in accordance with the increase. That is, a mechanism that includes the spring 276 serves as a mechanism for applying, to the working fluid in the storage chamber R8, an elastic reaction force having a magnitude in accordance with an amount of increase in the volume of the storage chamber R8. A mechanism that includes the reaction-force generating device 270 serves as a reaction-force applying mechanism in the master cylinder device 50.

<Operation of Hydraulic Brake System in Ordinary Braking Operation>

There will be explained an operation of the hydraulic brake system 40. As described above, the hydraulic brake system 40 includes the brake ECU 38 to which are connected the high-pressure-source device 58 and the above-indicated sensors and open/close valves. The brake ECU 38 controls the high-pressure-source device 58 and the open/close valves while monitoring the values detected by the sensors. Further, the brake ECU 38 controls the hydraulic brake system 40 such that the hydraulic braking force generated by the hydraulic brake system 40 becomes equal to the target hydraulic braking force output from the main ECU 30. When the braking operation is initiated, the brake ECU 38 controls the pressure increasing/decreasing device 60 in accordance with the target hydraulic braking force, so that the working fluid whose pressure has been regulated is supplied to the input chamber R5. Accordingly, the first pressurizing piston 152 moves forward in dependence on the input pressure, so as to pressurize the working fluid in the first pressurizing chamber R3. The second pressurizing piston 154 also moves forward by the pressure of the working fluid in the first pressurizing chamber R3, so as to pressurize the working fluid in the second pressurizing chamber R4. In other words, there is executed, in the hydraulic brake system 40, an input-pressure control for controlling the input pressure from the high-pressure-source device 58, such that the master pressure becomes equal to a pressure determined on the basis of the operation on the brake pedal 70.

Figure 5A:
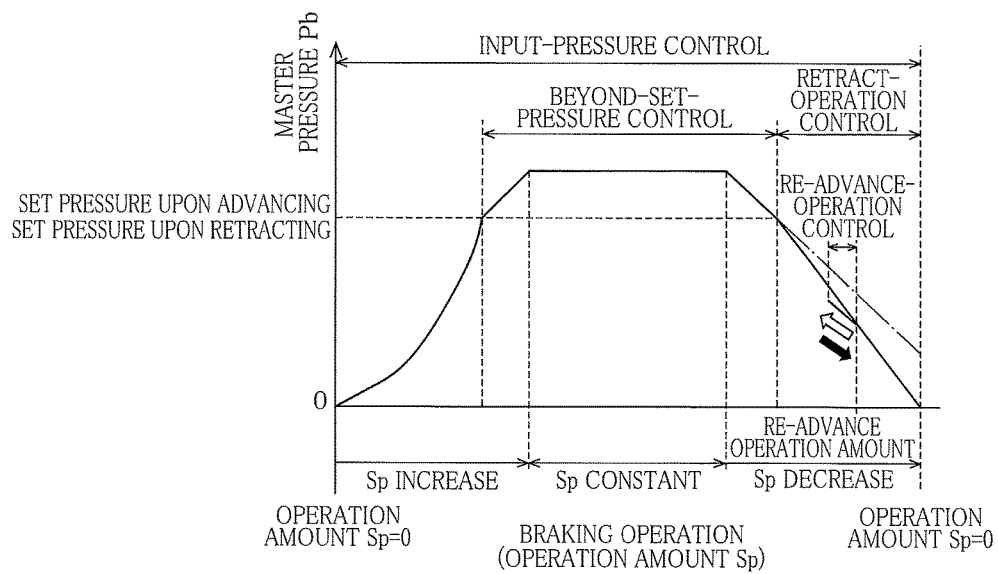
FIGS. 5A and 5B are graphs each showing a relationship between an operation amount and a master pressure in a time period from initiation to completion of a braking operation.

FIG. 5A schematically shows a relationship between an operation amount Sp and a master pressure Pb in a time period from initiation to completion of a braking operation. For easy understanding of the operation of the hydraulic brake system, FIG. 5A is illustrated to show a state in which no regenerative braking force is generated, namely, a state in which the hydraulic braking force starts to be generated when the operation on the brake pedal 70 is initiated. The master cylinder device 50 is configured such that an amount of the forward movement of the first pressurizing piston 152 is larger than an amount of the forward movement of the input piston 156 by the braking operation. In other words, the first pressurizing piston 152 moves forward such that the first pressurizing piston 152 moves away from the input piston 156, namely, such that the volume of the inter-piston chamber R7 becomes large, in association with the advancing movement of the brake pedal 70. In the hydraulic brake system 40, therefore, it is possible to generate a comparatively large hydraulic braking force by a comparatively small braking operation amount. Accordingly, in the process of an increase of the operation amount Sp in FIG. 5A, the master pressure Pb is illustrated so as to acceleratedly increase relative to the increase of the operation amount Sp. In association with the increase of the master pressure Pb, the pressurized working fluid is supplied to each brake device 56 via the antilock device 54, and the hydraulic braking force is generated in each brake device 56. It is noted that the brake ECU 38 monitors the detection values of the input-pressure sensor 252, and the pressure increasing/decreasing device 60 is controlled such that the input pressure becomes equal to a pressure in accordance with the target hydraulic braking force.

In the process of the increase of the operation amount Sp from initiation of the braking operation, the open/close valve 256 is energized so as to be opened while the open/close valve 260 is energized so as to be closed. Accordingly, fluid communication of the opposing chamber R6 and the inter-piston chamber R7 with the reservoir 62 via the low pressure passage 258 is shut off with the chambers R6 and R7 being held in communication with each other. As described above, in a state in which the brake pedal 70 is not operated, the inter-piston chamber R7 is held in communication with the reservoir 62 via the fluid passages 232, 234 and the communication holes 236, 238, 240. When the brake pedal 70 is slightly advanced by being operated, the seal 206 shuts off fluid communication between the communication hole 236 and the communication hole 238. That is, fluid communication of the inter-piston chamber R7 with the reservoir 122 via the fluid passages and the communication holes described above is shut off, so that the opposing chamber R6 and the inter-piston chamber R7 are hermetically closed. As a result, the opposing chamber R6 and the inter-piston chamber R7 are brought into communication with each other, thereby constituting a single reaction-force chamber.

The pressure of the working fluid in the opposing chamber R6 acts on the front end face of the flange 184, whereby the first pressurizing piston 152 undergoes the rearward biasing force. Further, the pressure of the working fluid in the inter-piston chamber R7 acts on the rear end face of the extension portion 182 of the first pressurizing piston 152, whereby the first pressurizing piston 152 undergoes the forward biasing force. As described above, in the first pressurizing piston 152, the pressure receiving area on which the pressure of the working fluid in the opposing chamber R6 acts is made equal to the pressure receiving area on which the pressure of the working fluid in the inter-piston chamber R7 acts. Therefore, the forward biasing force and the rearward biasing force have the same magnitude. As a result, the first pressurizing piston 152 that serves a pressure receiving piston is not moved by the pressure of the working fluid in the opposing chamber R6 and the pressure of the working fluid in the inter-piston chamber R7, but is moved by the pressure of the working fluid in the input chamber R5.

Because the above-described two pressure receiving areas are made equal in the first pressurizing piston 152, a decrease amount of the working fluid in one of the opposing chamber R6 and the inter-piston chamber R7 and an increase amount of the working fluid in the other of the opposing chamber R6 and the inter-piston chamber R7, which amounts associate with the movement of the first pressurizing piston 152, are equal. Accordingly, when the first pressurizing piston 152 moves, the volume of the working fluid in each of the opposing chamber R6 and the inter-piston chamber R7 flows changes while the working fluid flows between the opposing chamber R6 and the inter-piston chamber R7. That is, even if the first pressurizing piston 152 moves, the total volume of the opposing chamber R6 and the inter-piston chamber R7 does not change, and the pressure of the working fluid in each of the opposing chamber R6, the inter-piston chamber R7, and the storage chamber R8 does not change. Accordingly, even if the first pressurizing piston 152 moves in dependence on the pressure of the working fluid in the input chamber R5, the movement of the first pressurizing piston 152 does not cause any movement of the input piston 156. In other words, the master cylinder device 50 is configured such that the first pressurizing piston 152 and the input piston 156 are movable independently of each other when the input-pressure control is executed. In the master cylinder device 50, therefore, in the process of the increase of the operation amount Sp from initiation of the braking operation, there is established an input-pressure-dependent pressurizing state, namely, a state in which the working fluid to be supplied to the brake device 56 can be pressurized in dependence on mainly the pressure of the working fluid supplied from the high-pressure-source device 58. That is, in the master cylinder device 50, the input-pressure-dependent pressurizing state is established with the input piston 156 being freely movable relative to the first pressurizing piston 152.

When the input piston 156 moves forward in the input-pressure-dependent pressurizing state in accordance with the increase of the operation amount, the working fluid in the inter-piston chamber R7 flows out therefrom, so that the total volume of the opposing chamber R6 and the inter-piston chamber R7 decreases. The working fluid that has flowed out from the inter-piston chamber R7 flows into the storage chamber R8 of the reaction-force generating device 270, and the pressure of the working fluid in each of the opposing chamber R6, the inter-piston chamber R7, and the storage chamber R8 increases. More specifically, the elastic reaction force of the spring 276 increases, so that the pressure of the working fluid in each of the opposing chamber R6, the inter-piston chamber R7, and the storage chamber R8 increases. Thus, the reaction-force generating device 270 serves as a reaction-force applying mechanism for applying, to the input piston 156, a reaction force with respect to the forward movement of the input piston 156, the reaction force having a magnitude in accordance with the amount of the forward movement.

The pressure of the working fluid in the inter-piston chamber R7 also acts on the front end face of the input piston 156, so that the input piston 156 undergoes a rearward biasing force. The rearward biasing force is transmitted to the brake pedal 70 via the input piston 156, whereby the driver can feel the biasing force as an operation reaction force with respect to the braking operation that the driver has made. As described above, in association with the braking operation, namely, in association with the forward movement of the input piston 156, the pressure of the working fluid in the inter-piston chamber R7 increases. Therefore, the driver can feel an increase of the operation reaction force in accordance with the amount of the braking operation that the driver has made, irrespective of the pressure of the working fluid in each of the pressurizing chambers R3, R4, namely, irrespective of an actual hydraulic braking force. In other words, it is to be understood that the reaction-force generating device 270 partially constitute a stroke simulator configured to generate a reaction force in accordance with the braking operation by the driver while allowing the braking operation.

<Operation of Hydraulic Brake System when Large Hydraulic Braking Force is Required>

When a large hydraulic braking force that is larger than usual is required in a certain condition (hereinafter referred to as "large-braking-force-requiring condition" where appropriate), e.g., at the time of sudden braking, namely, when the operation amount of the brake pedal 70 becomes relatively large, in a situation in which the input-pressure-dependent pressurizing state is established, the open/close valve 256 is de-energized so as to be closed and the open/close valve 260 is de-energized so as to be opened in the present hydraulic brake system 40. That is, the opposing chamber R6 is brought into communication with the reservoir 62 via the external communication passage 254 and the low pressure passage 258, and the inter-piston chamber R7 is placed in a hermetically closed state. That is, a mechanism that includes the open/close valve 256 and the open/close valve 260 serves as a closing and opening mechanism for hermetically closing the inter-piston chamber R7 and opening the opposing chamber R6 to the reservoir 62. In this instance, the storage chamber R8 of the reaction-force generating device 270 is also brought into communication with the reservoir 62. Therefore, the first pressurizing piston 152 can move forward while permitting the working fluid in the opposing chamber R6 to flow into the reservoir 62. Because the inter-piston chamber R7 is hermetically closed, the volume of inter-piston chamber R7 is constant during the forward movement of the first pressurizing piston 152 and a spacing distance by which the input piston 156 and the first pressurizing piston 152 are spaced apart from each other is constant. Hence, the movement amount of the input piston 156 and the movement amount of the first pressurizing piston 152 in the subsequent braking operation thereafter are equal. Since the inter-piston chamber R7 is hermetically closed, the braking operation force by the driver is transmitted from the input piston 156 to the first pressurizing piston 152 through the working fluid in the inter-piston chamber R7. That is, in the master cylinder device 50, an operation-force-and-input-pressure-dependent pressurizing state is established in the large-braking-force-requiring condition. In the operation-force-and-input-pressure-dependent pressurizing state, the pressure of the working fluid in each of the pressurizing chambers R3, R4 is transmitted to the input piston 156, whereby the driver can feel, as the operation reaction force, a rearward biasing force caused by the pressure.

Determination as to whether or not the hydraulic brake system 40 is in the above-indicated large-braking-force-requiring condition is made by comparison between: the target hydraulic braking force described above; and a maximum hydraulic braking force in the input-pressure-dependent pressurizing state, i.e., a hydraulic braking force when the input pressure is substantially equal to the high-pressure-source pressure. That is, in a case where the target hydraulic braking force is larger than the maximum hydraulic braking force, the input-pressure-dependent pressurizing state is switched to the operation-force-and-input-pressure-dependent pressurizing state. Accordingly, in the present hydraulic brake system 40, the brake ECU 38 determines whether a large hydraulic braking force is required or not, on the basis of detection amounts by the high-pressure-source pressure sensor 96 and the input-pressure sensor 252. Further, in consideration of a margin that allows smooth switching, the brake ECU 38 is configured to output a command to open the open/close valve 256 and to close the open/close valve 260 when the input pressure exceeds a pressure that is slightly lower than the high-pressure-source pressure. Accordingly, the master pressure in this instance may be regarded as a set pressure upon advancing. In the hydraulic brake system 40, therefore, when the master pressure exceeds the set pressure upon advancing, the closing and opening mechanism is controlled to execute a beyond-set-pressure control in which the inter-piston chamber R7 is hermetically closed and the opposing chamber R6 is opened to the reservoir 62.

<Operation of Hydraulic Brake System when Brake Pedal is Retracted>

When the brake pedal 70 is retracted in a state in which the operation-force-and-input-pressure-dependent pressurizing state is established and the master pressure accordingly becomes lower than the set pressure upon advancing, the open/close valve 256 that has been closed is opened in accordance with a decrease in a subsequent decrease of the operation amount and the working fluid flows between the inter-piston chamber R7 and the reservoir 62 via the open/close valve 260 that is being opened, in the hydraulic brake system 40. That is, in the present hydraulic brake system 40, a mechanism that includes the open/close valve 256 and the open/close valve 260 serves as a fluid-flow permission mechanism for permitting a flow of the working fluid between the inter-piston chamber R7 and the reservoir 62. The fluid-flow permission mechanism permits the flow of the working fluid between the inter-piston chamber R7 and the reservoir 62 when the master pressure becomes lower than the set pressure upon retracting that has the same level as the set pressure upon advancing. That is, when the master pressure becomes lower than the set pressure upon retracting, the brake ECU 38 executes a retract-operation control in which the fluid-flow permission mechanism is controlled so as to permit the flow of the working fluid between the inter-piston chamber R7 and the reservoir 62. Since the first pressurizing piston 152 is being subjected to the rearward biasing force by the pressure of the working fluid in the first pressurizing chamber R3 and the input piston 156 is being subjected to the operation force, the working fluid in the inter-piston chamber R7 flows out into the reservoir 62 via the low pressure passage 258 when the open/close valve 256 is opened. When the working fluid in the inter-piston chamber R7 flows out into the reservoir 62, the first pressurizing piston 152 is retracted in accordance with the decrease amount of the working fluid. In other words, the volume of the inter-piston chamber R7 decreases, and the spacing distance between the input piston 156 and the first pressurizing piston 152 decreases. Further, the retracting movement of the first pressurizing piston 152 causes a decrease in the master pressure Pb, so that the hydraulic braking force generated in the brake devices 56 is decreased.

Figure 5B:
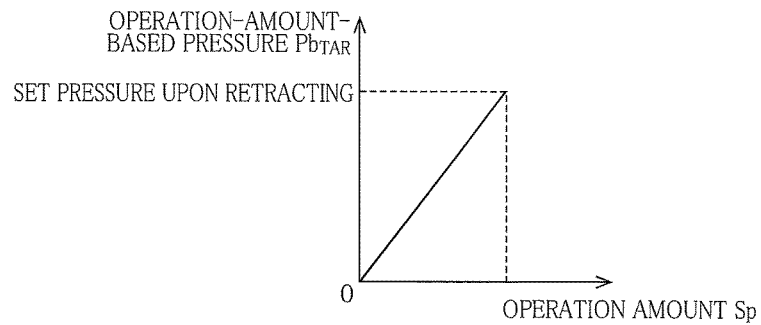

In the brake ECU 38, there is stored a map representing a relationship between: an operation amount Sp detected by the operation-amount sensor 74; and an operation-amount-based pressure $Pb_{TAR}$ that is the master pressure for generating the target hydraulic braking force corresponding to the operation amount Sp. FIG. 5B schematically shows the map. This map is set such that the operation-amount-based pressure $Pb_{TAR}$ increases, in proportion to the operation amount Sp, from 0 to the set pressure upon retracting. Accordingly, when the brake pedal 70 is advancing, the brake ECU 38 stores the set pressure upon advancing as the set pressure upon retracting. When the brake pedal 70 is retracting, the brake ECU 38 sets the map on the basis of the set pressure upon retracting and the braking operation amount Sp at a time when the master pressure is decreased down to the set pressure upon retracting.

In the retract-operation control, there is calculated, for the operation amount Sp, a hydraulic-pressure deviation $\Delta Pb$ that is a difference between the master pressure Pb and the operation-amount-based pressure $Pb_{TAR}$, as a deviation, and the open/close valve 256 is controlled such that the hydraulic-pressure deviation $\Delta Pb$ becomes equal to 0. That is, the target hydraulic braking force is generated in the brake devices 56 when the hydraulic-pressure deviation $\Delta Pb$ is 0. Accordingly, the brake ECU 38 changes a degree of restriction of the flow amount of the working fluid between the inter-piston chamber R7 and the reservoir 62, on the basis of the hydraulic-pressure deviation $\Delta Pb$. That is, in the hydraulic brake system 40, the master pressure Pb is an index value that changes based on the operation amount Sp of the brake pedal 70.

The degree of restriction of the flow amount of the working fluid is changed by changing a valve-opening time length $\Delta T$ of the open/close valve 256. That is, the brake ECU 38 controls the valve-opening time length $\Delta T$ of the open/close valve 256 based on the hydraulic-pressure deviation $\Delta Pb$, thereby changing the degree of restriction of the flow amount of the working fluid from the inter-piston chamber R7 to the reservoir 62. The valve-opening time length $\Delta T$ will be explained in more detail. The valve-opening time length $\Delta T$ is determined by the number of times N in which the open/close valve 256 is opened (hereinafter referred to as "number of times N of valve opening" where appropriate). The open/close valve 256 is configured to be opened for a time length $T_0$ (e.g., 2 msec)

when the brake ECU 38 commands the open/close valve 256 to be opened once. Accordingly, when the brake ECU 38 commands the open/close valve 256 to be opened N times, the valve-opening time length ΔT of the open/close valve 256 by the command is equal to $NT_0$. It is noted that, in the present hydraulic brake system 40, the number of times N of valve opening is five at the maximum. Thus, the valve-opening time length of the electromagnetic open/close valve in one valve opening is made comparatively short in the present hydraulic brake system 40. Hence, the position of the first pressurizing piston 152 and the position of the input piston 156 do not change rapidly in a time length during which the open/close valve 256 is being opened, so as to ensure a comparatively good operation feeling in the braking operation.

Figure 6:
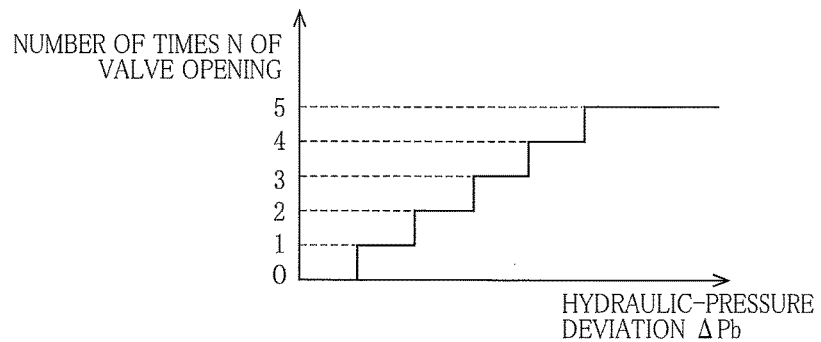
FIG. 6 is a graph showing a number of times to open an open/close valve to change a degree of restriction of a flow amount of the working fluid in a retract-operation control, with respect to a deviation of a pressure of the working fluid to be supplied to the brake device from an operation-amount-based pressure.

Therefore, in a case in which the number of times N of valve opening is large, a time period during which the inter-piston chamber and the reservoir 62 are held in fluid communication with each other becomes long, whereby the amount of the working fluid that can be flowed out from the inter-piston chamber R7 to the reservoir 62 becomes large. In other words, the degree of restriction of the flow amount of the working fluid decreases and the working fluid becomes more likely to flow with an increase in the number of times N of valve opening. In consequence, it is possible to increase a decrease amount of the volume of the inter-piston chamber, thereby making it possible to increase a reduction amount of the master pressure Pb. Accordingly, where a difference between the operation-amount-based pressure $Pb_{TAR}$ and the master pressure Pb is relatively large, the number of times N of valve opening N is determined so as to be large for enabling the difference to be quickly lessened. On the other hand, where the number of times N of valve opening is small, the time period during which the inter-piston chamber and the reservoir 62 are held in fluid communication with each other becomes short, whereby the amount of the working fluid that can be flowed out from the inter-piston chamber R7 to the reservoir 62 becomes small. In other words, the degree of restriction of the flow amount of the working fluid increases and the working fluid is less likely to flow with a decrease in the number of times N of valve opening. In consequence, it is possible to decrease the decrease amount of the volume of the inter-piston chamber, thereby making it possible to decrease the reduction amount of the master pressure Pb. Accordingly, where the difference between the operation-amount-based pressure $Pb_{TAR}$ and the master pressure Pb is relatively small, the difference is gradually lessened. Accordingly, the number of times N of valve opening is determined so as to be small. In view of this, there is stored, in the brake ECU 38, a map shown in FIG. 6, namely, a map representing a relation between the hydraulic-pressure deviation ΔPb and the number of times N of valve opening. On the basis of the map, the number of times N of valve opening is determined. Thus, in the present hydraulic brake system 40, the degree of restriction of the flow amount of the working fluid between the inter-piston chamber R7 and the reservoir 62 is changed by use of the electromagnetic open/close valve that is relatively inexpensive, resulting in a reduced cost of the hydraulic brake system 40.

By the retract-operation control, the spacing distance between the first pressurizing piston 152 and the input piston 156 is also changed. Accordingly, to restrict the flow amount of the working fluid by determining the degree of restriction of the flow amount of the working fluid such that the master pressure Pb becomes equal to the operation-amount-based pressure $Pb_{TAR}$ is to restrict the flow amount of the working fluid by determining the degree of restriction of the flow amount of the working fluid such that the spacing distance between the first pressurizing piston 152 and the input piston 156 becomes equal to a target spacing distance set in accordance with the operation amount of the brake operation member.

In the present hydraulic brake system 40, the degree of restriction of the flow amount of the working fluid is changed according to the map shown in FIG. 5B, such that the master pressure Pb becomes equal to the operation-amount-based pressure $Pb_{TAR}$ as a target value. Accordingly, when the operation amount Sp becomes equal to 0, namely, when the operation position of the brake pedal 70 returns to an initial position that is a position of the brake pedal 70 at the time of initiation of the braking operation, the volume of the inter-piston chamber R7 becomes equal to an initial volume, i.e., the volume at the time of initiation of the operation of the brake pedal 70 and the spacing distance between the first pressurizing piston 152 and the input piston 156 becomes equal to an initial spacing distance, i.e., the spacing distance at the time of initiation of the operation of the brake pedal 70. Accordingly, in the present hydraulic brake system 40, the degree of restriction of the flow amount is determined in a relatively simple method by use of the master pressure Pb.

Incidentally, where the brake pedal 70 is retracted with the inter-piston chamber R7 kept hermetically closed, the master pressure Pb does not become equal to 0 even if the brake pedal 70 is retracted to such an extent that the operation amount Sp becomes equal to 0, as indicated by the long dashed short dashed line in FIG. 5A. That is, the brake pedal 70 is retracted with the spacing distance kept larger than the initial spacing distance, so that the first pressurizing piston 152 cannot return to its position at the time of initiation of the braking operation. This causes an uncomfortable or unnatural feeling felt by the driver in the braking operation. In the present hydraulic brake system 40, when the brake pedal 70 is retracted, the brake pedal 70 returns to the initial position while the spacing distance between the first pressurizing piston 152 and the input piston 156 gradually returns to the initial spacing distance. Hence, it is possible to obviate a situation in which the master pressure Pb abruptly changes, whereby the driver is less likely to feel uncomfortable or unnatural in the braking operation.

<Operation of Hydraulic Brake System when Brake Pedal is Re-advanced>

Figure 7:
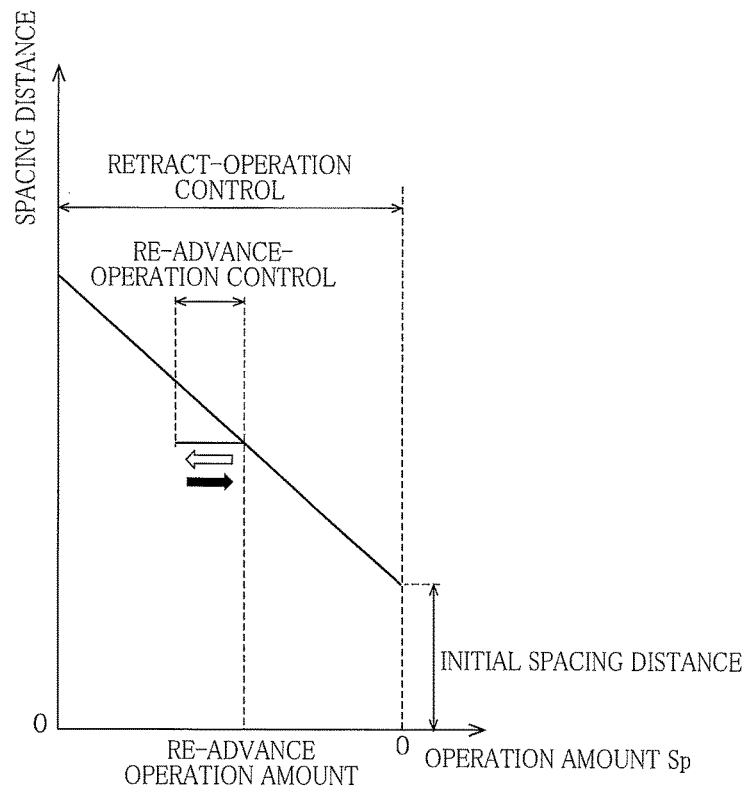
FIG. 7 is a graph showing a relationship between the operation amount of the brake operation member and a spacing distance between an input piston and a pressurizing piston, in the retract-operation control.

In the present hydraulic brake system 40, when the driver re-advances the brake pedal 70 in a situation in which the retract-operation control is being executed as described above, the open/close valve 256 is closed and there is executed a re-advance-operation control in which the flow of the working fluid between the inter-piston chamber R7 and the reservoir 62 is shut off. FIG. 7 shows a relationship between the operation amount Sp and the spacing distance in an instance in which the re-advance-operation control is executed in the middle of the retract-operation control. When the driver re-advances the brake pedal 70 in the middle of the retract-operation control, the operation amount Sp changes in a direction indicated by the open arrow in FIG. 7. That is, since the inter-piston chamber R7 is hermetically closed, only the operation amount Sp increases with the spacing distance kept unchanged. When the brake pedal 70 is re-retracted thereafter, the brake pedal 70 is retracted with the inter-piston chamber R7 kept hermetically closed, as indicated by the solid arrow in FIG. 7. Further, a change of the master pressure Pb with respect to a change of the operation amount Sp in the re-advance-operation control changes as indicated by the open arrow and the solid arrow in FIG. 5A. That is, when the brake pedal 70 is re-advanced, the amount of the forward movement of the first pressurizing piston 152 becomes slightly smaller and the master pressure Pb becomes slightly lower for the same operation amount Sp, by an amount of the working fluid that has flowed out from the inter-piston chamber R7 in the retract-operation control. However, the working fluid is pressurized with the inter-piston chamber R7 kept hermetically closed. Therefore, it is possible to obviate a situation in which the operation force is not transmitted to the first pressurizing piston 152 due to the flow of the working fluid from the inter-piston chamber R7 to the reservoir 62, so that the operation force is effectively utilized and the master pressure is accordingly increased.

When the operation amount Sp is reduced to the operation amount Sp at the time of initiation of the re-advance-operation control, the retract-operation control is again executed conditionally on the reduction. Accordingly, the brake ECU 38 stores the operation amount Sp at the time of initiation of the re-advance-operation control as a re-advance operation amount $Sp_{TH}$. In the present hydraulic brake system 40, therefore, even if the brake pedal 70 is re-advanced in a time period before the braking operation is released, the degree of restriction of the flow amount of the working fluid is changed on the basis of the same relationship as the relationship between the operation amount Sp and the master pressure Pb in an instance in which the brake pedal 70 is not re-advanced. Accordingly, the driver is less likely to feel uncomfortable or unnatural in the braking operation.

<Control Program for Hydraulic Brake System>

Figure 8:
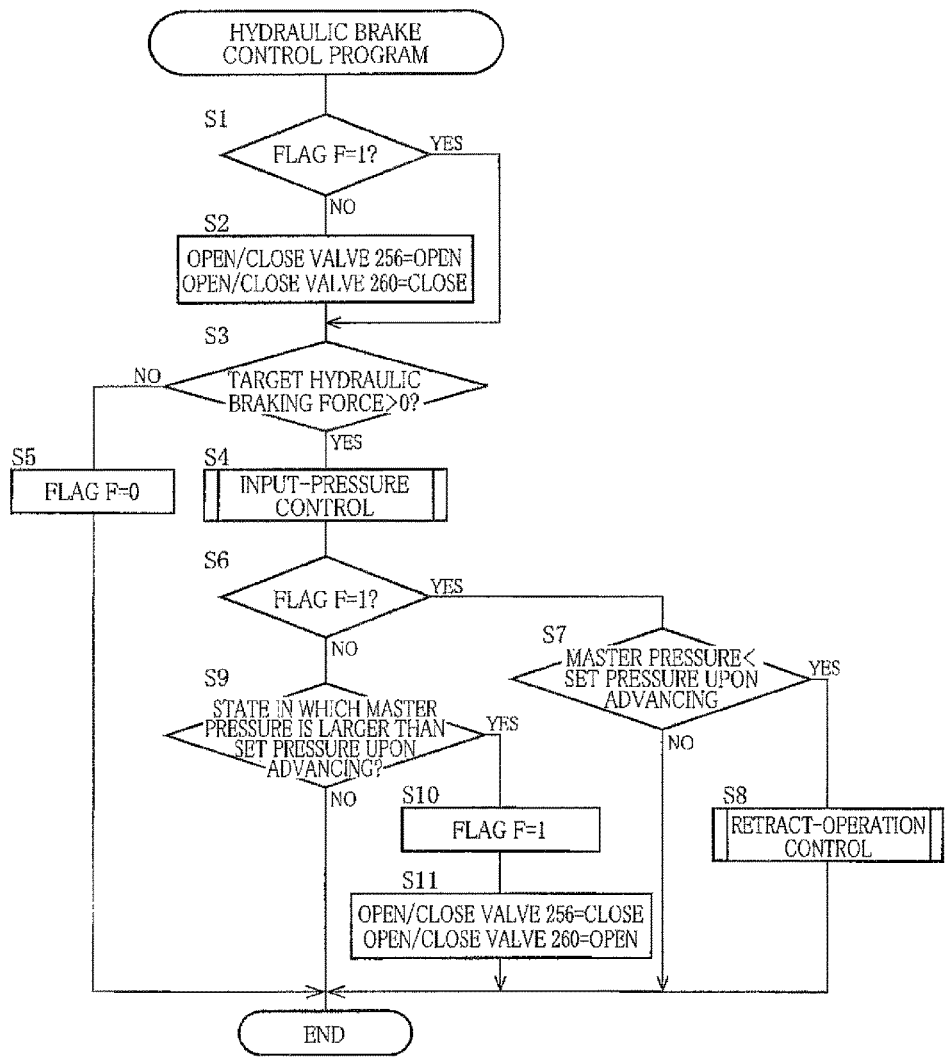
FIG. 8 is a flow chart of a hydraulic brake control program executed in the hydraulic brake system according to the first embodiment.

In the present hydraulic brake system 40, a hydraulic brake control program represented by a flow chart of FIG. 8 is repeatedly implemented at relatively short time intervals (e.g., several tens of milliseconds (msec). The pressurizing state of the master cylinder device 50 is switched based on processing according to the program. In the processing according to the program, initially, at Step 1 (hereinafter abbreviated as "S1" and other steps will be similarly abbreviated), it is judged whether a flag F is 1 or not. The flag F is configured to be set to 1 (in a step described below) when the master pressure Pb is larger than the set pressure upon advancing. When the flag F is not 1, S2 is implemented to open the open/close valve 256 and to close the open/close valve 260, whereby the input-pressure-dependent pressurizing state is established. On the other hand, when the flag F is 1, S2 is skipped. It is then judged at S3 whether or not the target hydraulic braking force is larger than 0, namely, whether or not the hydraulic braking force is required. When the hydraulic braking force is required, the input-pressure control is executed at S4. While not explained in detail, the input-pressure control is executed according to an input-pressure control subroutine. When it is judged at S3 that the hydraulic braking force is not required, the flag F is set to 0 at S5. Subsequently, at S6, it is again judged whether or not the flag F is 1. When the flag F is 1, it is judged at S7 whether or not the master pressure Pb is lower than the set pressure upon advancing. When the master pressure Pb is lower than the set pressure upon advancing, it is judged that the master pressure Pb became lower than the set pressure upon advancing after the master pressure Pb once exceeded the set pressure upon advancing, namely, it is judged that the master pressure Pb became lower than the set pressure upon retracting that is set at the same level as the set pressure upon advancing. In this instance, the retract-operation control is executed at S8. On the other hand, when it is judged at S6 that the flag F is not 1, it is judged at S9 whether or not the current state is a state in which the master pressure Pb is larger than the set pressure upon advancing. When the current state is the state in question, the flag F is set to 1 at S10. Subsequently, S11 is implemented to close the open/close valve 256 and to open the open/close valve 260, whereby the operation-force-and-input-pressure-dependent pressurizing state is established.

Figure 9:
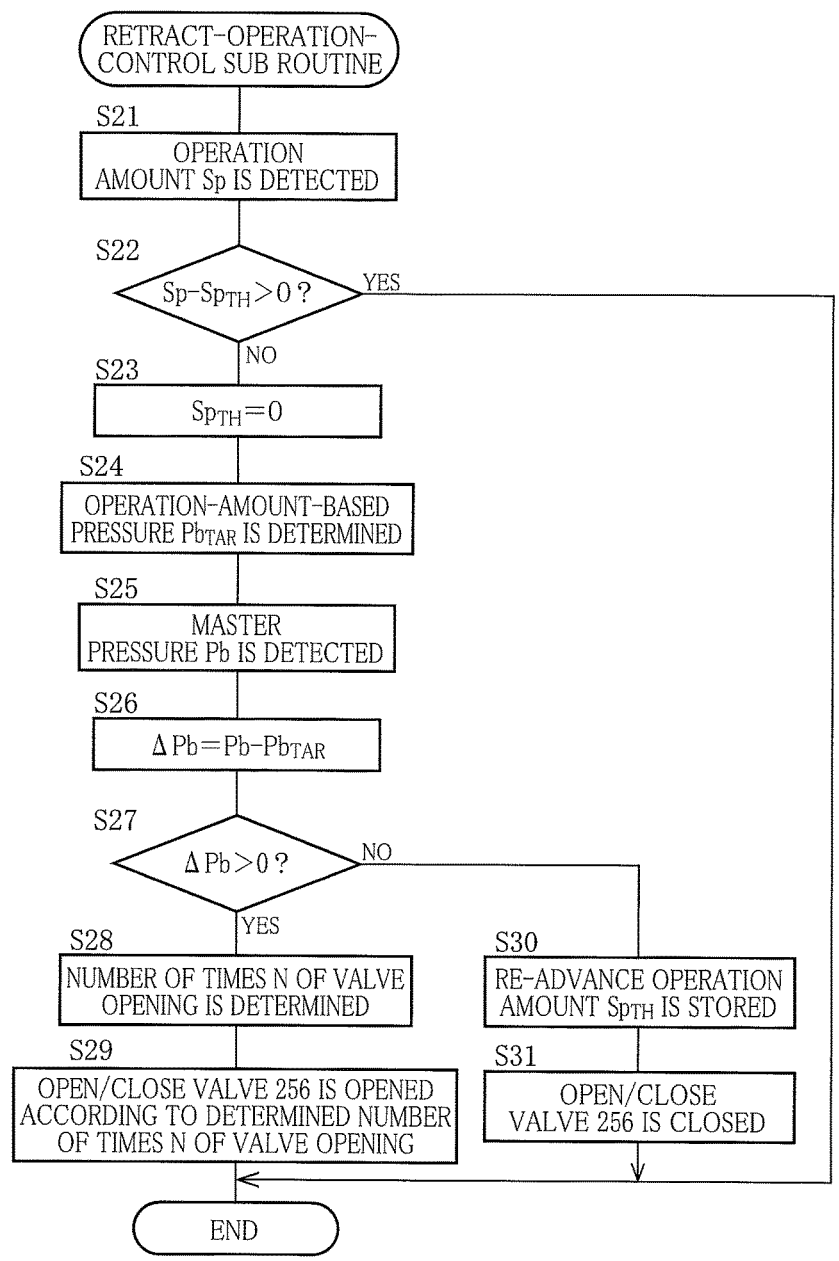
FIG. 9 is a flow chart of a retract-operation-control sub routine executed in the hydraulic brake system according to the first embodiment.

The retract-operation control at S8 in the flow chart of FIG. 8 is executed according to the retract-operation-control sub routine represented by a flow chart of FIG. 9. In processing according to the sub routine, initially, at S21, the operation amount Sp is detected. It is then judged at S22 whether or not a difference between the operation amount Sp and the re-advance operation amount $Sp_{TH}$ is larger than 0. When the difference is larger than 0, it means that the re-advance-operation control is being executed. Hence, the retract-operation-control sub routine is ended. When the difference is not larger than 0, it is judged that the brake pedal 70 was re-retraced and the operation amount Sp was decreased below the re-advance operation amount $Sp_{TH}$, and the value of the re-advance operation amount $Sp_{TH}$ is reset to 0 at S23. Subsequently, at S24, the operation-amount-based pressure $Pb_{TAR}$ corresponding to the operation amount Sp is determined utilizing the map. Subsequently, the master pressure Pb is detected at S25, and the hydraulic-pressure deviation ΔPb between the master pressure Pb and the operation-amount-based pressure $Pb_{TAR}$ is calculated at S26. At S27, it is judged whether or not the hydraulic-pressure deviation ΔPb is larger than 0. When the hydraulic-pressure deviation ΔPb is larger than 0, the number of times N in which the open/close valve 256 is to be opened, i.e., the number of times N of valve opening, is determined at S28 utilizing the map shown in FIG. 6, in accordance with the hydraulic-pressure deviation ΔPb, such that the number of times N of valve opening is held within a range from one time to five times. Subsequently, at S29, the open/close valve 256 is opened according to the determined number of times N of valve opening. On the other hand, when it is judged at S27 that the hydraulic-pressure deviation ΔPb is not larger than 0, the operation amount Sp is stored at S30 as the re-advance operation amount $Sp_{TH}$, and the open/close valve 256 is placed in its closed state at S31. That is, the re-advance-operation control is executed.

<Control Program and Functional Portions of Brake ECU>

Figure 10:
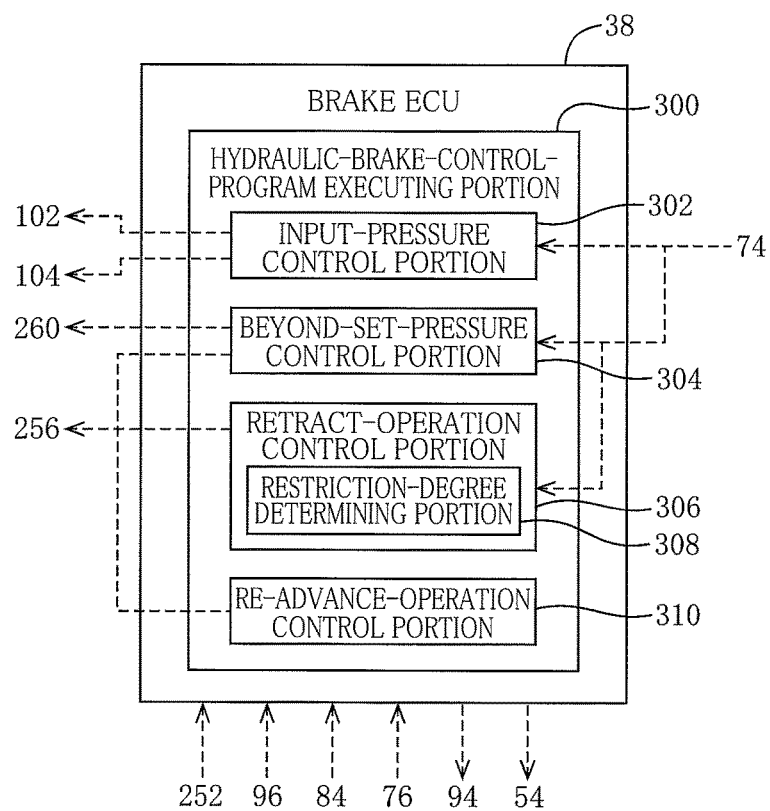
FIG. 10 is a block diagram showing a structure relating to a control of the hydraulic brake system according to the first embodiment.

In execution of the hydraulic-pressure control program, it is to be understood that the brake ECU 38 has a hydraulic-brake-control-program executing portion 300 as shown in FIG. 10. It is further to be understood that the hydraulic-brake-control-program executing portion 300 has some functional portions. More specifically, the hydraulic-brake-control-program executing portion 300 has an input-pressure control portion 302 configured to execute the input-pressure control, a beyond-set-pressure control portion 304 configured to execute the beyond-set-pressure control, and a retract-operation control portion 306 configured to execute the retract-operation control. Further, the retract-operation control portion 306 has a restriction-degree determining portion 308 configured to determine the degree of restriction of the flow amount of the working fluid.

The above-indicated functional portions will be explained in relation to the control processing executed according to the above-indicated programs. In the hydraulic brake control program, the processing at S4 corresponds to the input-pressure control portion 302, the processing at S10, S11 corresponds to the beyond-set-pressure control portion 304, and the processing at S8 corresponds to the retract-operation control portion 306. In the retract-operation-control sub routine, the processing at S28 corresponds to the restriction-degree determining portion 308 of the retract-operation control portion 306, and the processing at S31 corresponds to a re-advance-operation control portion 310 of the hydraulic-brake-control-program executing portion 300.

Second Embodiment

A hydraulic brake system according to the following second embodiment is identical in construction with the hydraulic brake system 40 of the first embodiment, except for the retract-operation-control sub routine for the hydraulic brake system. Accordingly, in the following explanation of the hydraulic brake system according to the second embodiment, the retract-operation-control sub routine executed in the hydraulic brake system of the second embodiment will be mainly explained in the interest of brevity.

Figure 11A:
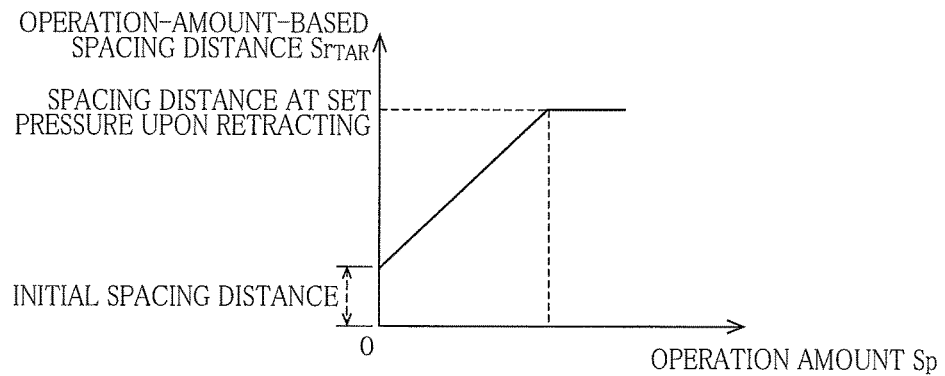
FIGS. 11A-11C are maps used in the retract-operation control in a hydraulic brake system according to a second embodiment.

In the retract-operation-control sub routine for the hydraulic brake system according to the second embodiment, an operation-amount-based volume $Qr_{TAR}$ is used in place of the operation-amount-based pressure $Pb_{TAR}$ used in the hydraulic brake system 40 of the first embodiment. The operation-amount-based volume $Qr_{TA}$ is the volume of the inter-piston chamber R7 when the target hydraulic braking force is generated for the operation amount Sp. Accordingly, in the present hydraulic brake system, the open/close valve 256 is controlled such that the volume Qr of the inter-piston chamber R7 becomes equal to the operation-amount-based volume $Qr_{TAR}$. To this end, in the hydraulic brake system, there is initially set an operation-amount-based spacing distance $Sr_{TAR}$, namely, a spacing distance between the first pressurizing piston 152 and the input piston 156 when the target hydraulic braking force is generated for the operation amount Sp. In the brake ECU 38, there is stored a map shown in FIG. 11A, i.e., a map representing a relationship between the operation amount Sp and the operation-amount-based spacing distance $Sr_{TAR}$ corresponding to the operation amount Sp. As shown in FIG. 11A, this map is set such that the operation-amount-based spacing distance $Sr_{TAR}$ increases, in proportion to the operation amount Sp, from the initial spacing distance to the set pressure upon retracting, namely, to the spacing distance Sr between the first pressurizing piston 152 and the input piston 156 when the open/close valve 256 is closed at the set pressure upon advancing.

Figure 11B:
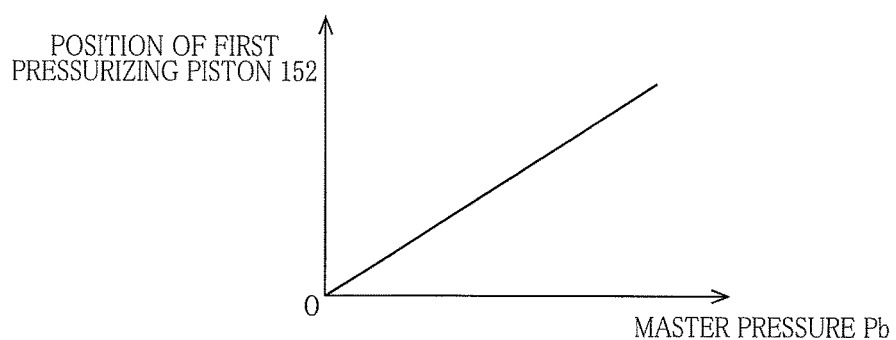

The spacing distance Sr is estimated from the master pressure Pb and the operation amount Sp. To be more specific, the master pressure Pb increases in proportion to the amount of forward movement of the first pressurizing piston 152. In view of this, there is stored, in the brake ECU 38, a map shown in FIG. 11B, i.e., a map showing the master pressure Pb and a position of the first pressurizing piston 152 corresponding to the master pressure Pb. The position of the first pressurizing piston 152 can be estimated based on the map. Because the brake pedal 70 and the input piston 156 are connected to each other, the position of the input piston 156 can be estimated from the operation amount Sp. The spacing distance Sr can be estimated from the thus estimated position of the first pressurizing piston 152 and position of the input piston 156. Further, the volume Qr of the inter-piston chamber R7 can be calculated by multiplying the spacing distance Sr by the cross-sectional area of the inter-piston chamber R7. Accordingly, the volume Qr of the inter-piston chamber R7 can be estimated from the master pressure Pb and the operation amount Sp. Similarly, the operation-amount-based volume $Qr_{TAR}$ can be calculated from the operation-amount-based spacing distance $Sr_{TAR}$ by multiplying the cross-sectional area of the inter-piston chamber R7.

Accordingly, in the retract-operation control for the present hydraulic brake system, a volume deviation ΔQr that is a difference between the volume Qr and the operation-amount-based volume $Qr_{TAR}$ is calculated, as a deviation, for the operation amount Sp, and the open/close valve 256 is controlled such that the volume deviation ΔQr becomes equal to 0. That is, when the volume deviation ΔQr is equal to 0, the target hydraulic braking force is generated in the brake devices 56. Therefore, the brake ECU 38 changes the degree of restriction of the flow amount of the working fluid between the inter-piston chamber R7 and the reservoir 62, on the basis of the volume deviation ΔQr. That is, in the hydraulic brake system, the volume Qr is an index value that changes on the basis of the operation amount Sp of the brake pedal 70. As explained above, the volume Qr of the inter-piston chamber R7 is calculated utilizing the spacing distance Sr. Accordingly, it is to be understood that the degree of restriction of the flow amount is changed on the basis of the spacing-distance deviation ΔSr. In this sense, in the hydraulic brake system, the spacing distance Sr may be regarded as an index value that changes on the basis of the operation amount Sp of the brake pedal 70.

Figure 11C:
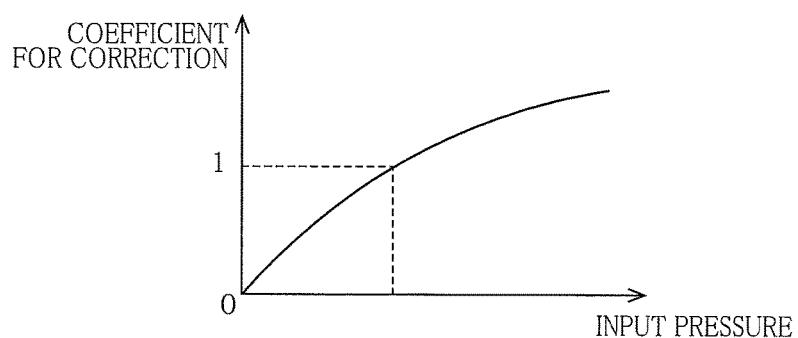

The degree of restriction of the flow amount of the working fluid is changed by changing the valve-opening time length ΔT of the open/close valve 256, as in the hydraulic brake system 40 of the first embodiment. In the hydraulic brake system, there is calculated an outflow amount $QrΔ_T$ that is an amount of the working fluid which flows out from the inter-piston chamber R7 in the valve-opening time length ΔT. In view of this, the brake ECU 38 stores, as a reference outflow amount, an amount of the working fluid which flows out from the inter-piston chamber R7 in one valve opening of the open/close valve 256, and the brake ECU 38 calculates the outflow amount $QrΔ_T$ on condition that the working fluid flows out from the inter-piston chamber R7 in an amount corresponding to the number of times N of valve opening of the open/close valve 256. Moreover, the outflow amount $QrΔ_T$ changes in accordance with the level of the input pressure that is the pressure in the inter-piston chamber R7. In view of this, the brake ECU 38 stores a map shown in FIG. 11C, i.e., a map showing a coefficient for correcting the reference outflow amount with respect to the input pressure. By subtracting the thus calculated outflow amount $QrΔ_T$ from the volume Qr of the inter-piston chamber R7 before the open/close valve 256 is opened, the volume Qr of the inter-piston chamber R7 after the open/close valve 256 is opened is calculated.

In the hydraulic brake system, therefore, the flow amount of the working fluid is restricted by determining the degree of restriction of the flow amount of the working fluid such that the volume Qr of the inter-piston chamber becomes equal to the operation-amount-based volume $Qr_{TAR}$. In other words, the flow amount of the working fluid is restricted by determining the degree of restriction of the flow amount of the working fluid such that the spacing distance Sr becomes equal to the target spacing distance set in accordance with the operation amount of the brake operation member. Accordingly, in the hydraulic brake system, when the brake pedal 70 is retracted, the position of the brake pedal 70 returns to the initial position while the spacing distance between the first pressurizing piston 152 and the input piston 156 gradually returns to the initial spacing distance. Hence, it is possible to obviate a situation in which the master pressure Pb abruptly changes, whereby the driver is less likely to feel uncomfortable or unnatural in the braking operation.

<Control Program for Hydraulic Brake System>

Figure 12:
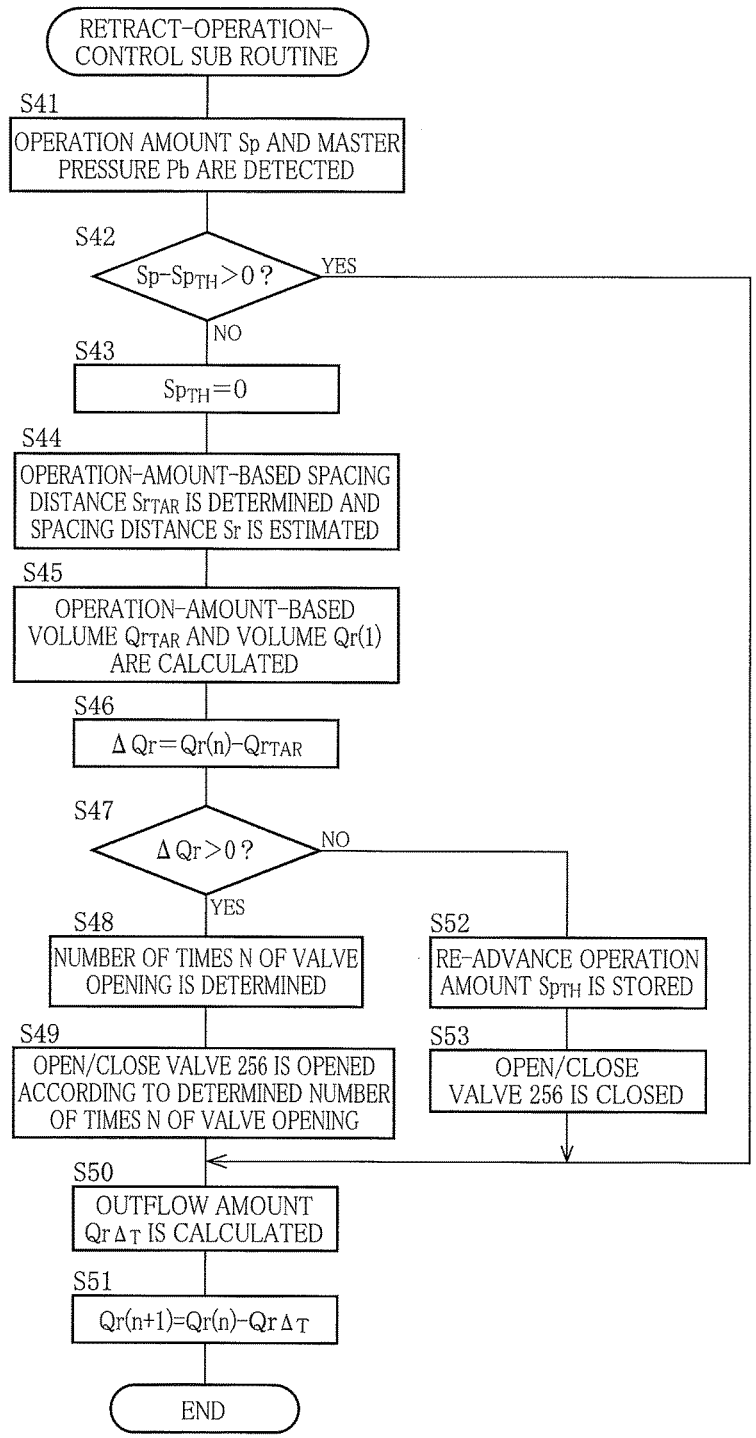
FIG. 12 is a flow chart of a retract-operation-control sub routine executed in the hydraulic brake system according to the second embodiment.

In the hydraulic brake system, the retract-operation control is executed according to a retract-operation-control sub routine represented by a flow chart of FIG. 12. In processing according to the sub routine, initially, at S41, the operation amount Sp and the master pressure Pb are detected. It is then judged at S42 whether or not a difference between the operation amount Sp and the re-advance operation amount $Sp_{TH}$ is larger than 0. When the difference is larger than 0, it means that the re-advance-operation control is being executed. Hence, the retract-operation-control sub routine is ended. When the difference is not larger than 0, on the other hand, it is judged that the brake pedal 70 was re-retracted and the operation amount Sp was decreased below the re-advance operation amount $Sp_{TH}$, and the value of the re-advance operation amount $Sp_{TH}$ is reset to 0 at S43. Subsequently, at S44, the operation-amount-based spacing distance $Sr_{TAR}$ corresponding to the operation amount Sp is determined utilizing the map, and the actual spacing distance Sr is estimated. Subsequently, at S45, the operation-amount-based volume $Qr_{TAR}$ is calculated from the operation-amount-based spacing distance $Sr_{TAR}$, and the volume Qr is calculated from the spacing distance Sr. In this respect, the volume Qr is calculated from the spacing distance Sr only when the control sub routine is initially executed, and the outflow amount $Qr\Delta_T$ calculated in a subsequent step is utilized in subsequent calculation of the volume Qr. That is, where the number of times of execution of the retract-operation-control sub routine is defined as "n" and the volume in the n-th time execution is defined as "Qr(n)", the volume Qr(1) is calculated from the spacing distance Sr. The volume deviation $\Delta Qr$ is calculated at S46, and it is judged at S47 whether or not the volume deviation $\Delta Qr$ is larger than 0. When the volume deviation $\Delta Qr$ is larger than 0, the number of times N in which the open/close valve 256 is opened, i.e., the number of times N of valve opening, is determined at S48 utilizing the map similar to that shown in FIG. 6, in accordance with the volume deviation $\Delta Qr$, such that the number of times N of valve opening is held within a range from one time to five times. Subsequently, at S49, the open/close valve 256 is opened according to the determined number of times N of valve opening. At S50, the outflow amount $Qr\Delta_T$ that is an amount of the working fluid flowed out from the inter-piston chamber R7 by n times valve opening is calculated referring to the map of FIG. 11C. At S51, the volume Qr(n+1) of the inter-piston chamber R7 after the open/close valve 256 is opened is calculated. It is noted that the volume Qr(n+1) is utilized for calculation of the volume deviation $\Delta Qr$ at S46 in next execution of the retract-operation-control sub routine. When it is judged at S47 that the volume deviation $\Delta Qr$ is not larger than 0, on the other hand, the re-advance-operation control is executed at S52, S53.

The functional portions shown in FIG. 10 will be explained in relation to the control processing executed according to the above-indicated sub routine. In the retract-operation-control sub routine, the processing at S48 corresponds to the restriction-degree determining portion 308 of the retract-operation control portion 306, and the processing at S53 corresponds to the re-advance-operation control portion 310 of the hydraulic-brake-control-program executing portion 300.

Third Embodiment

A hydraulic brake system according to the following third embodiment is identical in construction with the hydraulic brake system according to the second embodiment, except for the retract-operation-control sub routine. Accordingly, in the following explanation of the hydraulic brake system according to the third embodiment, the retract-operation-control sub routine executed in the hydraulic brake system of the third embodiment will be mainly explained in the interest of brevity.

In the retract-operation-control sub routine for the hydraulic brake system according to the third embodiment, the operation-amount-based spacing distance $Sr_{TAR}$ is set, as in the retract-operation control of the hydraulic brake system according to the second embodiment. Accordingly, the map shown in FIG. 11A is stored in the brake ECU 38, the map representing the relationship between the operation amount Sp and the operation-amount-based spacing distance $Sr_{TAR}$ for the operation amount Sp. Further, the spacing distance Sr is estimated utilizing the map shown in FIG. 11B, the map representing the master pressure Pb and the position of the first pressurizing piston 152 corresponding to the master pressure Pb.

Accordingly, the retract-operation control in the hydraulic brake system according to the present embodiment, a spacing-distance deviation $\Delta Sr$ that is a difference between the spacing distance Sr and the operation-amount-based spacing distance $Sr_{TAR}$ is calculated, as a deviation, for the operation amount Sp, and the open/close valve 256 is controlled such that the spacing-distance deviation $\Delta Sr$ becomes equal to 0. That is, when the spacing-distance deviation $\Delta Sr$ is 0, the target hydraulic braking force is generated in the brake devices 56. Therefore, the brake ECU 38 changes the degree of restriction of the flow amount of the working fluid between the inter-piston chamber R7 and the reservoir 62, on the basis of the spacing-distance deviation $\Delta Sr$. That is, in the hydraulic brake system, the spacing distance Sr is an index value that changes on the basis of the operation amount Sp of the brake pedal 70.

The degree of restriction of the flow amount of the working fluid is changed by changing the valve-opening time length $\Delta T$ of the open/close valve 256, as in the hydraulic brake system 40 of the first embodiment. In the present hydraulic brake system, there is calculated a spacing-distance change amount $Sr\Delta_T$ that is an amount of change of the spacing distance in the valve-opening time length $\Delta T$. In view of this, the brake ECU 38 stores, as a reference spacing-distance change amount, a spacing distance that changes in one valve opening of the open/close valve 256, and the brake ECU 38 calculates the spacing-distance change amount $Sr\Delta_T$ on condition that the spacing distance Sr changes by an amount corresponding to the number of times N of valve opening of the open/close valve 256. Moreover, the spacing-distance change amount $Sr\Delta_T$ changes in accordance with the level of the input pressure that is the pressure in the inter-piston chamber R7. In view of this, the brake ECU 38 stores a map similar to that shown in FIG. 11C, i.e., a map showing a coefficient for correcting the reference spacing-distance change amount with respect to the input pressure. By subtracting the thus calculated spacing-distance change amount $Sr\Delta_T$ from the spacing distance Sr before the open/close valve 256 is opened, the spacing distance Sr after the open/close valve 256 is opened is calculated.

In the hydraulic brake system, therefore, the flow amount of the working fluid is restricted by determining the degree of restriction of the flow amount of the working fluid such that the spacing distance Sr becomes equal to the operation-amount-based spacing distance $Sr_{TAR}$. Accordingly, in the hydraulic brake system, when the brake pedal 70 is retracted, the position of the brake pedal 70 returns to the initial position while the spacing distance Sr gradually returns to the initial spacing distance. Hence, it is possible to obviate a situation in which the master pressure Pb abruptly changes, whereby the driver is less likely to feel uncomfortable or unnatural in the braking operation.

<Control Program for Hydraulic Brake System>

Figure 13:
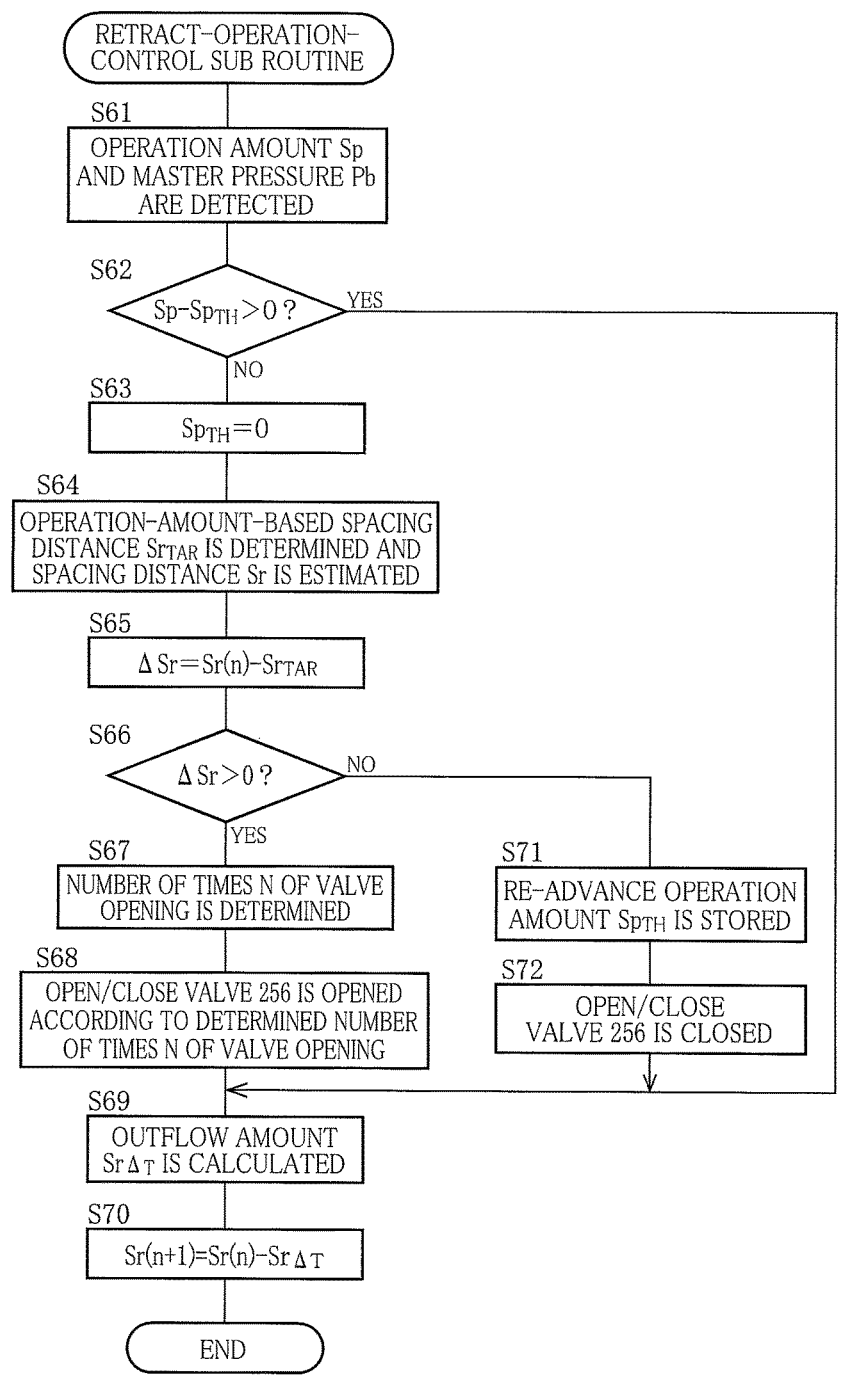
FIG. 13 is a flow chart of a retract-operation-control sub routine executed in a hydraulic brake system according to a third embodiment.

In the hydraulic brake system according to the present embodiment, the retract-operation control is executed according to a retract-operation-control sub routine represented by a flow chart of FIG. 13. In processing according to the sub routine, initially, at S61, the operation amount Sp and the master pressure Pb are detected. It is then judged at S62 whether or not a difference between the operation amount Sp and the re-advance operation amount $Sp_{TH}$ is larger than 0. When the difference is larger than 0, it means that the re-advance-operation control is being executed. Hence, the retract-operation-control sub routine is ended. On the other hand, when the difference is not larger than 0, it is judged that the brake pedal 70 was re-retracted and the operation amount Sp was decreased below the re-advance operation amount $Sp_{TH}$, and the value of the re-advance operation amount $Sp_{TH}$ is reset to 0 at S63. Subsequently, at S64, the operation-amount-based spacing distance $Sr_{TAR}$ corresponding to the operation amount Sp is determined utilizing the map, and the actual spacing distance Sr is estimated. In this respect, the spacing distance Sr is estimated from the operation amount Sp only when the control sub routine is initially executed, and the spacing-distance change amount $Sr\Delta_T$ calculated in a subsequent step is utilized in subsequent estimation of the spacing distance Sr. That is, where the number of times of execution of the retract-operation-control sub routine is defined as "n" and the spacing distance in the n-th time execution is defined as "Sr(n)", the spacing distance Sr(1) is estimated from the operation amount Sp. The spacing-distance deviation ΔSr is calculated at S65, and it is judged at S66 whether or not the spacing-distance deviation ΔSr is larger than 0. When the spacing-distance deviation ΔSr is larger than 0, the number of times N in which the open/close valve 256 is opened, i.e., the number of times N of valve opening, is determined at S67 utilizing the map shown in FIG. 6, in accordance with the spacing-distance deviation ΔSr, such that the number of times N of valve opening is held within a range from one time to five times. Subsequently, at S68, the open/close valve 256 is opened according to the determined number of times N of valve opening. At S69, the spacing-distance change amount $Sr\Delta_T$ that is an amount of the spacing distance that changed by n-times valve opening is calculated referring to a map similar to that of FIG. 11C. At S70, the spacing distance Sr(n+1) after the open/close valve 256 is opened is calculated. It is noted that the spacing distance Sr(n+1) is utilized for calculation of the spacing-distance deviation ΔSr at S65 in next execution of the retract-operation-control sub routine. When it is judged at S66 that the spacing-distance deviation ΔSr is not larger than 0, on the other hand, the re-advance-operation control is executed at S71, S72.

The functional portions shown in FIG. 10 will be explained in relation to the control processing executed according to the above-indicated sub routine. In the retract-operation-control sub routine, the processing at S67 corresponds to the restriction-degree determining portion 308 of the retract-operation control portion 306, and the processing at S72 corresponds to the re-advance-operation control portion 310 of the hydraulic-brake-control-program executing portion 300.

Description of Reference Numerals

38: brake ECU (controller) 40: hydraulic brake system 50: master cylinder device 56: brake device 58: high-pressure-source device 62: reservoir (low-pressure source) 70: brake pedal (brake operation member) 150: housing 152: first pressurizing piston (pressurizing piston) 156: input piston 176: inner flange (partition portion) 178: through-hole (opening) 180: main body portion 256: electromagnetic open/close valve (closing and opening mechanism, fluid-flow permission mechanism) 260: electromagnetic open/close valve (closing and opening mechanism, fluid-flow permission mechanism) 270: reaction-force generating device (reaction-force applying mechanism) 302: input-pressure control portion 304: beyond-set-pressure control portion 306: retract-operation control portion 308: restriction-degree determining portion 310: re-advance-operation control portion R1: front-side chamber R2: rear-side chamber R3: first pressurizing chamber (pressurizing chamber) R5: input chamber R6: opposing chamber R7: inter-piston chamber

The invention claimed is:

1. A hydraulic brake system for braking a vehicle by utilizing a pressure of a working fluid, comprising:
   a brake device provided for a wheel,
   a master cylinder device configured to pressurize the working fluid and to supply the pressurized working fluid to the brake device;
   a brake operation member which is disposed rearward of the master cylinder device and on which a braking operation by a driver is made;
   a high-pressure-source device configured to highly pressurize the working fluid, to regulate the highly-pressurized working fluid, and to supply the regulated working fluid to the master cylinder device; and
   a controller configured to control the hydraulic brake system,
   wherein the master cylinder device has (a) a housing whose front-side end is closed and which includes a partition portion partitioning an interior of the housing into a front-side chamber and a rear-side chamber, the partition portion having an opening formed therethrough, (b) a pressurizing piston which has a main body portion having a flange formed at a rear end of the main body portion and disposed in the front-side chamber, and (c) an input piston connected to the brake operation member and disposed in the rear-side chamber,
   wherein the master cylinder device has (A) a pressurizing chamber which is defined forward of the main body portion of the pressurizing piston and in which the working fluid to be supplied to the brake device is pressurized by a forward movement of the pressurizing piston, (B) an inter-piston chamber defined between the pressurizing piston and the input piston by utilizing the opening formed in the partition portion of the housing, such that the pressurizing piston and the input piston face to each other with the inter-piston chamber interposed therebetween, (C) an input chamber which is defined between the flange formed on the main body portion of the pressurizing piston and the partition portion and to which the working fluid from the high-pressure-source device is supplied, and (D) an opposing chamber which is formed forward of the flange so as to be opposed to the input chamber with the flange interposed therebetween,
   wherein (E) a pressure receiving area of the pressurizing piston on which a pressure of the working fluid in the inter-piston chamber acts and a pressure receiving area of the pressurizing piston on which a pressure of the working fluid in the opposing chamber acts are made equal to each other, and the inter-piston chamber and the opposing chamber are brought into communication with each other so as to serve as a single reaction-force chamber in the master cylinder device, wherein the master cylinder device further has (I) a reaction-force applying mechanism configured to apply, to the input piston, a reaction force against a forward movement of the input piston having a magnitude in accordance with an amount of the forward movement, by elastically pressurizing the working fluid in the reaction-force chamber, in a state in which the reaction-force chamber is defined by the inter-piston chamber and the opposing chamber which are brought into communication with each other and the reaction-force chamber is not held in communication with the low-pressure source, (II) a closing and opening mechanism for hermetically closing the inter-piston chamber and opening the opposing chamber to a low-pressure source, and (III) a fluid-flow permission mechanism for permitting a flow of the working fluid between the inter-piston chamber and the low-pressure source, wherein the controller is configured to:
control the high-pressure-source device so as to control a pressure of the working fluid that is supplied from the high-pressure-source device to the input chamber, such that the pressure of the working fluid to be supplied to the brake device becomes equal to a pressure determined based on the braking operation on the brake operation member;

execute a beyond-set-pressure control in which the closing and opening mechanism is controlled so as to hermetically close the inter-piston chamber and to open the opposing chamber to the low-pressure source, when the pressure of the working fluid to be supplied to the brake device exceeds a set pressure upon advancing in association with an advancing movement of the brake operation member; and execute a retract-operation control in which the fluid-flow permission mechanism is controlled so as to permit the flow of the working fluid between the inter-piston chamber and the low-pressure source, when the pressure of the working fluid to be supplied to the brake device becomes lower than a set pressure upon retracting in association with a retracting movement of the brake operation member in an instance where the beyond-set-pressure control is being executed.

2. The hydraulic brake system according to claim 1, wherein the fluid-flow permission mechanism permits the flow of the working fluid between the inter-piston chamber and the low-pressure source while restricting a flow amount of the working fluid.

3. The hydraulic brake system according to claim 1, wherein the fluid-flow permission mechanism is configured such that a degree of restriction of the flow amount of the working fluid between the inter-piston chamber and the low-pressure source is changeable.

4. The hydraulic brake system according to claim 3, wherein, in the retract-operation control, the controller is configured to:
determine the degree of restriction of the flow amount of the working fluid between the inter-piston chamber and the low-pressure source based on an operation amount of the brake operation member; and
restrict the flow amount of the working fluid between the inter-piston chamber and the low-pressure source in accordance with the determined degree of restriction of the flow amount of the working fluid between the inter-piston chamber and the low-pressure source.

5. The hydraulic brake system according to claim 4, wherein the controller is configured to determine the degree of restriction of the flow amount of the working fluid between the inter-piston chamber and the low-pressure source, such that a spacing distance between the pressurizing piston and the input piston becomes equal to a spacing distance set in accordance with the operation amount of the brake operation member.

6. The hydraulic brake system according to claim 1, wherein the controller is configured to execute a re-advance-operation control in which the fluid-flow permission mechanism is controlled to shut off the flow of the working fluid between the inter-piston chamber and the low-pressure source, when the brake operation member is re-advanced during execution of the retraction-operation control.

7. The hydraulic brake system according to claim 6, wherein the controller is configured to again execute the retract-operation control irrespective of whether the pressure of the working fluid to be supplied to the brake device is lower than the set pressure upon retracting, when the brake operation member is re-retracted during execution of the re-advance-operation control.

* * * * *